United States Patent
Kaneko et al.

[15] 3,676,585

[45] July 11, 1972

[54] CONVERTING EQUIPMENT OF STANDARD TELEVISION BROADCASTING SIGNALS

[72] Inventors: Ryuichi Kaneko; Toshiya Saito; Yasushi Fujimura; Hiroshi Ianimra, all of Tokyo; Totaro Nakamura, Sagamihara; Yukisaburo Ikedo, Tokyo, all of Japan

[73] Assignee: Nippon Hoso Kyokai, Tokyo, Japan

[22] Filed: Oct. 16, 1970

[21] Appl. No.: 81,253

[30] Foreign Application Priority Data

Nov. 10, 1969 Japan....................................44/89273
Nov. 10, 1969 Japan....................................44/89274

[52] U.S. Cl.........................178/6.8, 178/5.4 C, 178/DIG. 24
[51] Int. Cl.............................................................H04n 5/02
[58] Field of Search.........................178/5.4 C, DIG. 24, 608

[56] References Cited

UNITED STATES PATENTS 3,457,369 7/1969 Davies et al. ...........................178/6.8

*Primary Examiner*—Robert L. Griffin
*Assistant Examiner*—Richard K. Eckert, Jr.
*Attorney*—Stevens, Davis, Miller & Mosher

[57] ABSTRACT

A converting equipment of television broadcasting signals using delay lines and effecting a conversion between different television standards using the different number of the scanning lines and the different number of fields and also the ratio of the input and output field numbers is not an integer number. More particularly, a non-locked type real time converting equipment effecting a conversion between a television standard using 625 scanning lines per frame and 50 fields per second mainly used in Europe and a television standard using 525 scanning lines per frame and 59.94 fields per second mainly used in the United States of America and Japan. The equipment comprises a signalling system having as main constructive elements, a line interpolator, a line converter, a field converter and a field interpolator and a controlling system controlling the signalling system and effecting a non-locked type television standard conversion. The non-locked type television standard system conversion may be effected by successively setting states or conditions of the conversions such as for instance, a field conversion, a line conversion, etc., starting from a conversion having a larger conversion unit period in accordance with a phase difference between input and output fields to be converted, and then to a conversion having a minimum conversion unit period and the line conversion and the field conversion are controlled with respect to the conditions of the conversion. The converting equipment can be used for the both way real time conversion and has an essential feature that the converted output signal is correctly locked to the synchronizing signal of the television signal of the output side.

6 Claims, 23 Drawing Figures

CONVERTING EQUIPMENT OF STANDARD TELEVISION BROADCASTING SIGNALS

BACKGROUND OF THE INVENTION

1. Field of the Invention

The present invention relates to a converting equipment effecting conversion between a color television signal broadcasting standard system using 625 scanning lines per frame and 50 fields per second mainly used in Europe, which will be abbreviated as 625/50 system hereinafter, and a color television signal broadcasting standard system using 525 scanning lines per frame and 59.94 fields per second mainly employed in the United States of America and Japan, which will be abbreviated as 525/60 system.

2. Description of the Prior Art

According to the recent remarkable development of the communication satellite repeating system and the popularization of the television broadcasting in various countries, an international color television broadcasting between countries using different broadcasting standards has become more and more popular. More especially, an international multiple station color television broadcasting program or an international contest program has been introduced into service. Accordingly, the necessity of the converting equipment being able to effect both way real time conversion in a high quality has greatly been increased.

One kind of the convention standard system converting equipment is based on a principle of so-called as "image transfer", wherein a displayed picture on a cathode ray tube of one of the standard systems is photo-electrically converted into another standard system by using a camera tube of the latter system. An electronic converting system is also known, wherein the signal in one of the standards is treated by switching process using a plurality of delay lines to convert into an electric signal of the other standard. The former, the image transfer system has disadvantages in that the converted picture is inferior in the tone reproduction by the photo-electric conversion and that the reproduced picture may include an influence of flare so that a high quality conversion is difficult. The applicants has been proposing an electronic converting equipment in a copending application Ser. No. 818,341 now abandoned. Said proposed converting equipment is a system effecting both way conversion between 625/50 and 525/60 systems, in which the interpolation treatment is effected in a principle of FM interpolation in order to avoid possible deterioration in quartz delay element and a weighted addition is effected.

Said proposed electronic converting system is so-called locked type converting equipment, in which a ratio between the number of fields per second of an input signal and that of an output signal is always an integer. Therefore, the output synchronizing signal thus derived is also corelated with the synchronizing signal of the input signal. Accordingly, as for instance when converting a color television signal of 525/60 system or more exactly 525 scanning lines and 59.94 fields per second system used in the United States of America or Japan into a signal according to the 625/50 standard system used in Europe, the converted output signal becomes entirely outside of PAL standard, which is one of the standard broadcasting system presently used in Europe. Therefore, if it is desired to make a conversion from 525/60 system to 625/50 PAL system, a real time conversion is not possible, but the converted signal should once be recorded by means of a video tape recording equipment (VTR) and is played back thereafter by making an adjustment of the playing back speed.

SUMMARY OF THE INVENTION

The present invention relates to an electronic converting equipment of color television broadcasting standard systems by means of controlled switching of a group of delay lines, and more particularly to a non-locked type converting equipment of color television standard systems being able to effect high quality real time conversion in response to phase differences between input and output field periods even when the ratio between the numbers of input and output fields per second does not constitute an integer number.

The present invention has for its object to realize an effective standard system converting equipment of television broadcasting signals being able to effect high quality real time both way conversion between standard systems having different field numbers and different scanning line numbers, wherein the conversion is effected by interchanging situations of the line conversion and the field conversion in accordance with the phase difference of the input and output fields.

The other object of the present invention is to realize a converting equipment of television broadcasting standard systems being able to derive converted black and white or color television signal of which a synchronizing signal is locked to a particular synchronizing signal of the television signal of the output standard system by effecting the conversion to correlate with the output synchronizing signal.

In the explanation of the equipment of the present invention, the conversion from 625/50 system to 525/60 system is termed as forward conversion and the conversion in the reverse direction is termed as backward conversion.

In order to fulfill the abovementioned objects, the converting equipment according to the present invention comprises a signalling system or signal treating device, having as the main constructive elements, a line interpolator, a line converter, a field converter and a field interplator, which had been proposed as the main parts of the electronic color television broadcasting standard system converting equipment, and also a controlling system to control the line converter and the field converter of the signal converting system to effect the non-locked type conversion.

The converting equipment according to the present invention has in combination the proper feature of the locked type system converting equipment such as the line converter and the field converter for effecting the locked type conversion, wherein the ratio of the numbers of fields of the input and output signals, and a feature to effect the non-locked type conversion, by determining a pair of input and output fields for which paired fields the conversion must be completed before a certain period, for instance before 2 field period and exchanging the states of the line conversion and the field conversion in accordance with continuously varying phase difference of the paired fields.

The converting function of the signalling system in the forward conversion, i.e., in the conversion from 625/50 system to 525/60 system is to delete 50 scanning lines at the line conversion from 312.5 input scanning lines per each input field and to derive 262.5 output scanning lines. During the line converting operation, the input signal is given a delay corresponding to 50 scanning lines per each field, then one scanning line out of six successive scanning lines is deleted except for the first 12 scanning lines. The conversion is effected by inserting the next scanning line into the space formed by the deletion of the scanning line. During the field converting operation to make conversion from 50 fields to 60 fields, the space produced by the deletion of 50 scanning lines per each field is concentrated after making some deduction for a certain period termed as a unit quantity of the field conversion and which will be explained later on, and to adjust the difference of the field frequencies of the two systems, the signal of a field is used repeatedly once in each 5 fields.

In case of backward conversion in which 525/60 system is converted into 625/50 system, the number of the scanning lines of the desired output signal per each field is 312.5. This number of the scanning lines should be obtained by adding 50 lines to the 262.5 input scanning lines per field. For effecting the field conversion, a space is previously made to insert one scanning line in each five scanning lines except the first 12 scanning lines, and a scanning line is inserted in the space to effect the line conversion. For effecting the field conversion, during the operation of conversion from 60 fields to 50 fields, the space for adding 50 scanning lines is increased by a certain period, which is termed as the unit quantity of the field conversion and will be explained later on, and is made to be vacant, and then one field is deleted from successive five fields to adjust the difference of the number of the fields for the both systems.

The essential function of the equipment of the present invention is to effect the non-locked type standard conversion, which is summarized in that the setting of input and output field pair and the decision of initial value of line conversion, that of field conversion and that of the starting point of the conversion. Namely, a pair of input and output fields is selected in such a manner that the phase difference between input and output signals is to be over a certain predetermined value and moreover an amount of a part of the phase difference exceeding said predetermined value becomes minimum.

The phase difference between paired input and output fields thus decided is integrally divided by the unit quantity of the field conversion to set the initial value of field conversion, and the residue of said division is further divided integrally by the unit quantity of line conversion to decide the initial value of line conversion.

The starting point for the conversion is previously calculated with respect to the initial value of line conversion and initial value of field conversion. By the initial values of the conversions and the starting points for each of the conversions, the line conversion and the field conversion are controlled to effect an exchange of the line conversion and the field conversion so as to perform the non-locked type conversion.

BRIEF DESCRIPTION OF THE DRAWING

FIG. 1 shows diagrammatically a basic construction of the television standard system converting equipment according to the present invention. As shown in FIG. 1, the converting equipment of the invention generally consists of a signalling system and a controlling system. In the signalling system, a line interpolation, a line conversion, a field conversion and a field interpolation are mainly carried out. These functions are essential for the conversion of the television standard system.

Such a signalling system has been disclosed in a copending application Ser. No. 818,341.

At first, the construction of the signalling system will be explained by way of an example. In this embodiment, a television signal is to be processed in a form of SECAM signal in order to avoid a deterioration of the signal in a transmitting channel.

Figure 2:
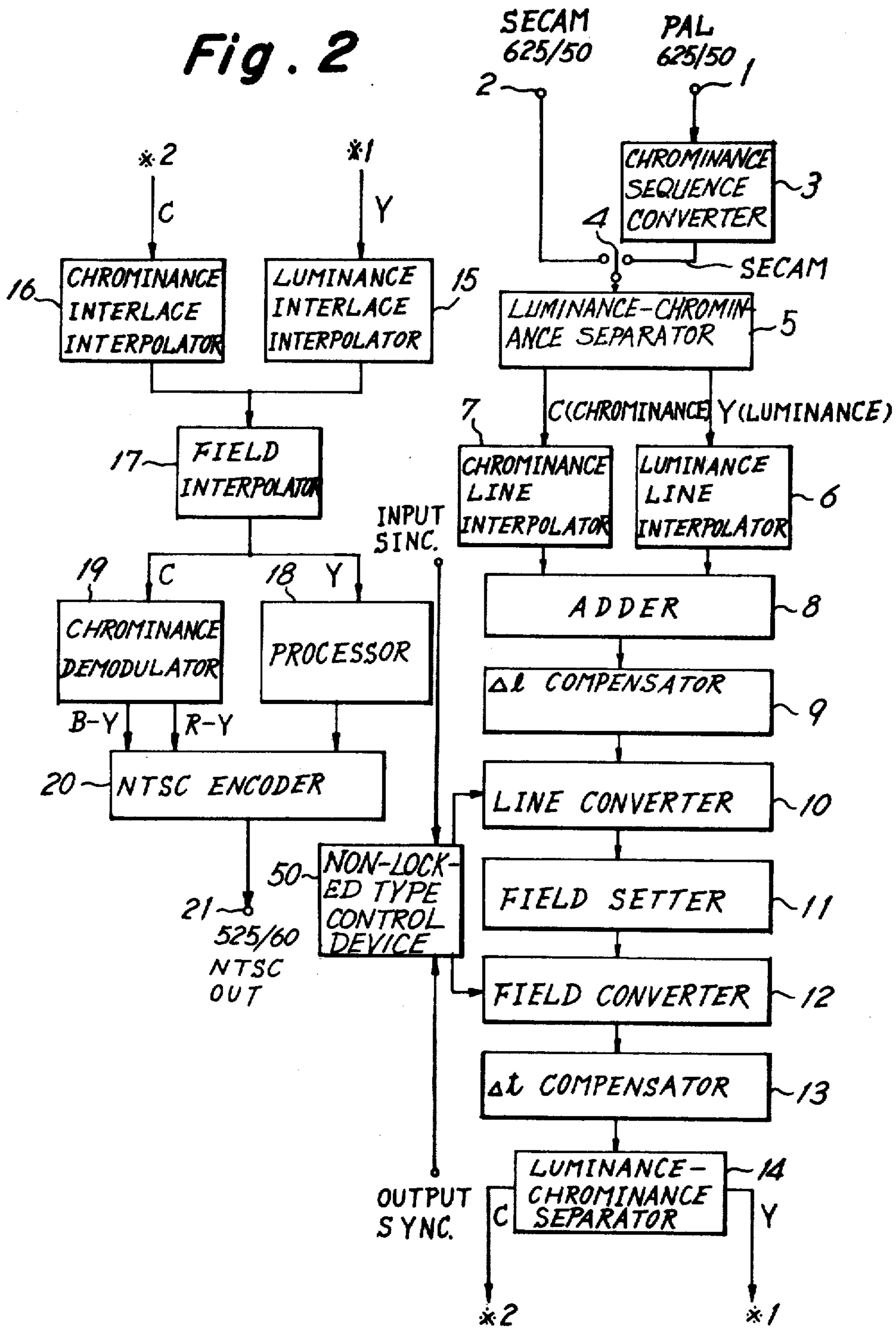
FIG. 2 is a block diagram showing an example of the signalling system of the converting equipment according to the present invention in case of forward conversion.

FIG. 2 is a block diagram showing the signalling system of the television standard system converting equipment according to the invention for converting input PAL or SECAM signal of 625 lines/50 fields in Europe into output NTSC signal of 525 lines/60 fields. Hereinafter, the conversion of this direction will be named as a forward conversion and a conversion of the opposite direction will be called as a backward conversion.

If an input signal is PAL signal of 625/50 system, it is applied to an input terminal 1. PAL signal is converted into SECAM signal of 625/50 system by a chrominance sequence converter 3. In the chrominance sequence converter 3, PAL signal of 625/50 system is once demodulated and luminance and color signals are derived. Then, after a carrier component of PAL signal has been sufficiently attenuated, the resultant signal is applied to a SECAM encoder so as to produce SECAM signal of 625/50 having line sequential color signals. This SECAM signal of 625/50 is applied to a luminance-chromiance separator 5 through a switcher 4. On the other hand, when SECAM signal of 625/50 system is received, it is applied to an input terminal 2 and further applied to the luminance-chrominance signal separator 5 through the switcher 4. Thus, by changing over the switcher 4 depending on a fact that whether PAL signal of 625/50 system or SECAM signal of 625/50 system is received, SECAM signal can be applied to the separator 5. The luminance or brightness signal Y separated by the separator 5 is applied to a line interpolating stage 6 for luminance signal and the chrominance or color signal C is applied to a line interpolating stage 7 for chrominance signal. The line interpolation is to compensate a discontinuity of an inclined line in a picture which will be introduced by a deletion of scanning lines in a line conversion to be effected in a later stage.

That is, in the line interpolating stages 6 and 7, informations of lines to be deleted by the line conversion are distributed to upper and lower adjacent lines before said informations are deleted by the line conversion in order to appear the input line informations at correct line positions in an output reproduced picture. To this end informations of adjacent lines are summed with given weights in order to make the inclined line in the input picture to be reproduced as a straight line. In this case the luminance signals of the adjacent lines can be summed with each other at different weights. However, in SECAM system the color difference signals R-Y and B-Y are transmitted in turn on alternative lines, so that it is impossible to combine color difference signals on adjacent lines. Moreover, in case of the forward conversion, one line out of six lines is to be deleted in the line conversion, it happens that the color difference signal of the same kind, for instance the color difference signal R-Y is transmitted on two successive lines, because one line having thereon the color difference signal B-Y is lost, so that the quality of color reproduction in the vertical direction is reduced. Thus, according to the invention, the luminance signal and the chrominance signal are separately treated in the line interpolation. As will be explained later, in the chrominance line interpolator 7, the interpolation is effected by combining a line with a two preceding line. Moreover, the chrominance line interpolation is so performed that the color sequence of an output signal is maintained even after the line conversion. After the line interpolation, the brightness signal and the color signal are added in an adder 8. Since the luminance interpolation is effected in 30 MHz band and the chrominance interpolation is effected in 4 MHz band and moreover the signal is processed as 30 MHz FM signal which is suitable for transmission through delay lines in later stages, in the adder 8 the frequency conversion is effected two times. Thus 30 MHz signal can be obtained which is the same as that is obtained by the modulation by SECAM signal.

In a $\Delta l$-compensating stage 9 for correcting a difference $\Delta l$ of scanning line length between input and output lines, a line converting stage 10, a field setter stage 11, a field converting stage 12 and a $\Delta t$-compensating stage 13 for correcting a time error $\Delta t$, both of the combined brightness and color signals are treated commonly.

At an output terminal of the time error compensating stage 13, a signal of 525/60 system is obtained. This signal has a color signal which is line sequencially superposed in a frequency modulation manner. This signal may be displayed on a monitor. However, since the same field is reproduced twice each five fields in the field converting stage 12, an interlace setting is not sufficient and an image on the monitor swings up and down at a frequency of 5 Hz. In order to remove such a swinging and to obtain a perfect image an interlace interpolation is effected. Also in this case, since the chrominance interlace interpolation cannot be effected between two successive lines as in the case of the chrominance line interpolation, an output from the time error correcting stage 13 is applied to a luminance-chrominance separator 14 and the luminance signal and the chrominance signal are derived separatedly. The luminance signal is applied to a luminance interlace interpolating stage 15 and the chrominance signal is applied to a chrominance interlace interpolating stage 16. After the interlace interpolation, both signals are commonly applied to the field interpolating stage 17. After the field interpolation, an output signal is again separated into the luminance signal and the chrominance signal. The luminance signal Y is applied to a NTSC encoder 20 through a processor 18. The processor 18 is to remove defects of the brightness signal in a flyback period due to switching pulses in various stages. On the other hand, the color signal C is applied to a chrominance signal demodulator 19 after the field interpolation. In the demodulator 19, the color signal is converted from a line sequential signal into a simultaneous signal with use of an 1-line delay element and is demodulated. Thus, continuous color difference signals Y and B-Y may be obtained. These signals are applied to a NTSC encoder 20.

In this manner at an output terminal 21 of the NTSC encoder 20, the brightness signal and the color signal of NTSC signal of 525/60 system can be obtained.

Next the backward conversion will be explained.

Figure 3:
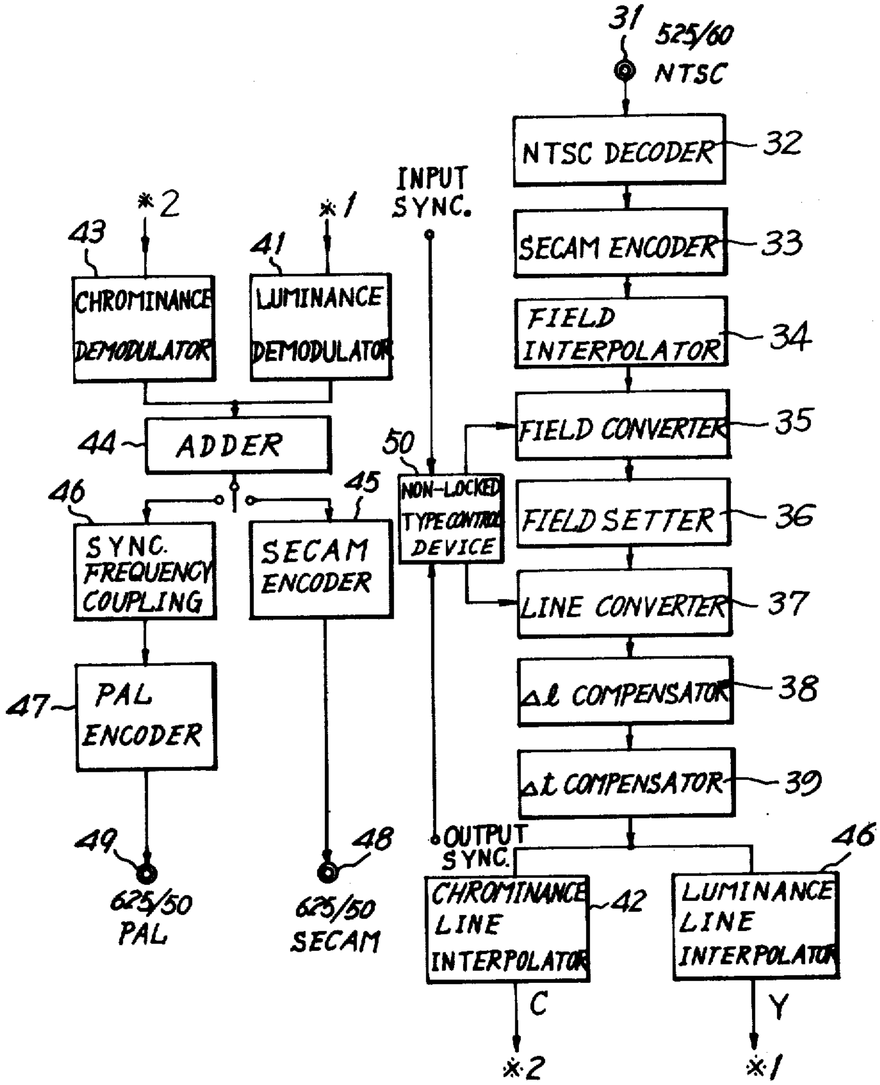
FIG. 3 is a block diagram of the signalling system of the equipment of the present invention in case of backward conversion.

In principle, the backward conversion can be carried out by passing the signal through the converting equipment in the reverse direction. FIG. 3 shows a block diagram of the signalling system in case of the backward conversion. Main differences from the forward conversion are as follows;

(1) Since the number of fields must be reduced, the interlace interpolation is not necessary.

(2) Since the number of lines must be increased, the color sequence is changed. This is corrected in the line interpolation. That is, the chrominance line interpolation is carried out in such a manner that among successive twelve lines, the color sequence of first six lines are unchanged and that of next six lines are reversed.

(3) In order to obtain correct SECAM or PAL signal, individual encoder for each signal must be provided.

In FIG. 3 a NTSC signal of 525/60 system is applied to an input terminal 31. The signal is further applied to a field interpolating stage 34 through a NTSC decoder 32 and a SECAM encoder 33. The field interpolation is to compensate a discontinuity of the movement of a moving object in a picture which is produced by converting input six fields into output five fields in a field converting stage 35. An output of the field converting stage 35 is applied to a line converting stage 37 through a field setter stage 36 and 525 lines are converted into 625 lines. After the line conversion an output of the line converting stage 37 is applied to a stage 38 for correcting a difference $\Delta l$ of line length and is further applied to a stage 39 for correcting a time error $\Delta t$.

An output signal of the stage 39 is separated into a brightness signal Y and a color signal C. The brightness signal Y is applied to an adder 44 through a luminance line interpolating stage 40 and a luminance demodulator 41. The color signal is applied to the adder 44 through a chrominance line interpolating stage 42 and a chrominance demodulator 43. An output of the adder 44 is applied to an output terminal 48 through a SECAM encoder 45 so as to supply SECAM signal of 625/60 or applied to an output terminal 49 through a synchronizing frequency coupling stage 46 and a PAL encoder 47 so as to supply PAL signal of 625/50 system.

Now the controlling system of the converting equipment according to the invention will be explained.

Figure 1:
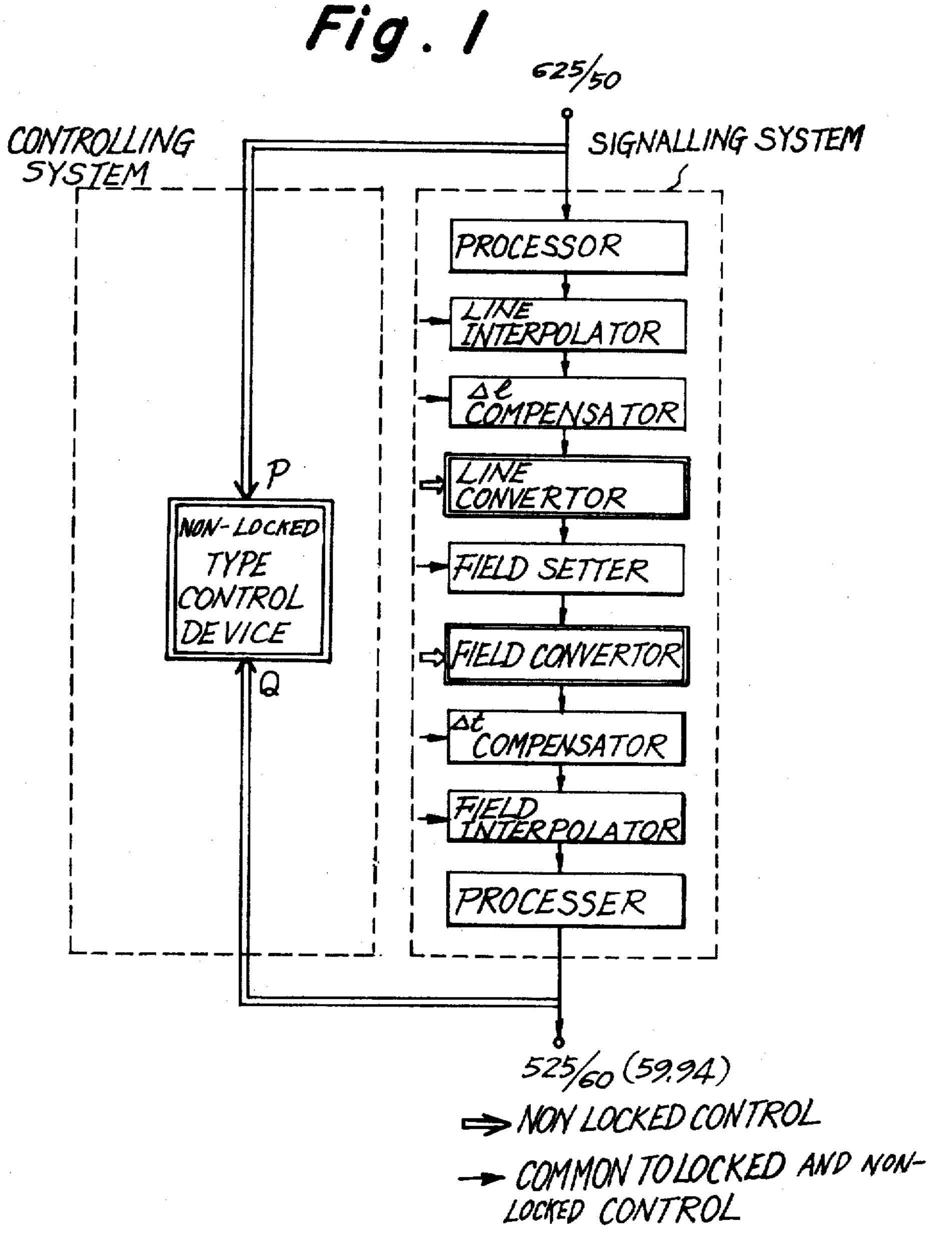
FIG. 1 is a basic block diagram of the converting equipment according to the present invention.

As shown in FIG. 1, in the controlling system, synchronizing signals of output and input signals are applied to a non-locked type controlling stage 50 and conditions of the line conversion and the field conversion are controlled in accordance with phase differences between the input and output synchronizing signals so as to perform a non-locked type conversion.

Now assuming such a condition that the number of fields per second of the input and output signals is integral number and the input signal is converted with maintaining a given phase. Specific functions of the field conversion and the line conversion under such condition will be first explained with reference to FIG. 4.

Figures 4, 5:
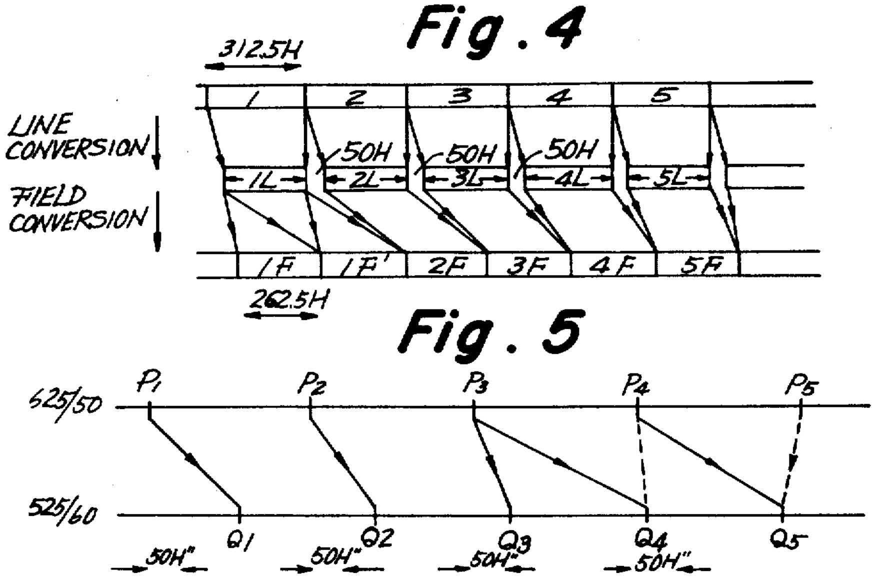
FIG. 4 is an explanatory diagram for the line conversion and field conversion wherein the numbers of fields of input and output are in integer ratio.
FIG. 5 is an explanatory diagram for the decision of input and output field pair.

When a signal of 625/50 is to be converted into a signal of 525/60 as shown in FIG. 4, in the line conversion the number of input lines of 312.5 per field is reduced to 262.5 of output lines by deleting 50 lines per field.

This conversion is effected as follows. Afield of input signal is delay by 50 lines and lines are deleted every six lines except for the first 12 lines and spaces formed by the deletion are successively filled with next lines. In the field conversion the same field is used twice every five fields and 50 fields are converted to 60 fields. In this conversion 1L is delayed by 50 lines of the minimum delay time in the field conversion system. Then by combining 262.5 lines, 1L is delayed by 50 lines plus 262.5 lines into 1F'. As shown in FIG. 4, there are spaces of 50 lines between 1L and 2L, 2L and 3L, etc., so that 2L is delayed by 262.5 lines into 2F and then the delay time is reduced by 50 lines and 3L is delayed by 262.5–50 lines into 3F and so on.

The delay time is successively reduced by 50 lines and 3L, 4L . . . are converted into 4F, 5F . . . In this manner six delay times corresponding to 1F, 1F' 2F, 3F, 4F, 5F are repeatedly used so as to carry out the field conversion.

Next, the non-locked type television standard system conversion will be explained. In the present case it is assumed that a ratio of the number of input fields and output fields is not integer.

In such a non-locked type conversion the input synchronizing system and the output synchronizing system are independent from each other, so that a phase relation between input and output signals is continuously changed. But, the converted output signal must always correspond to the synchronization of a broadcasting station at an output end. Thus, in the converting equipment according to the invention, the non-locked type conversion is effected in such a manner that during a suitable period (in this specific example two fields) a pair of fields of the input and output signals is selected and during the conversion process, amounts of delay time for the field conversion and the line conversion are exchanged in response to phase differences between said paired fields.

Figure 6:
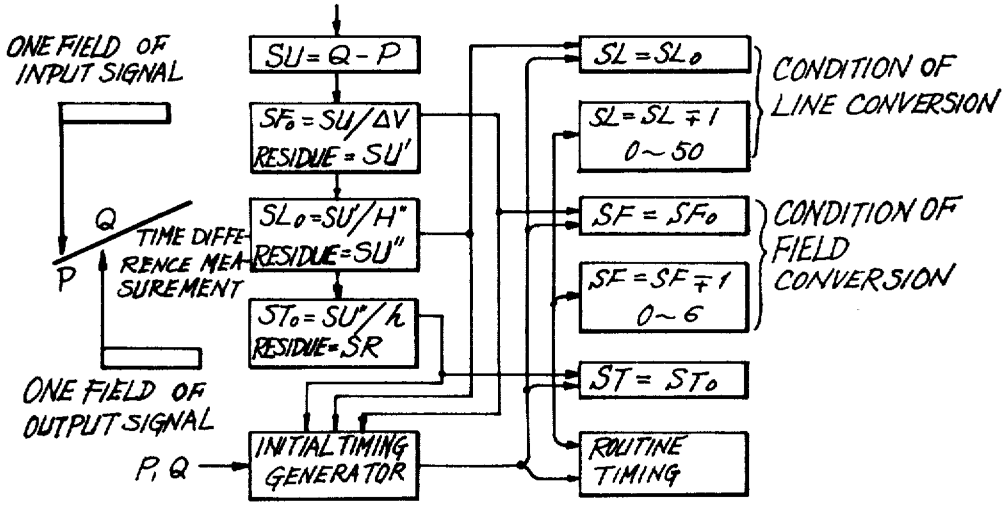
FIG. 6 is a block diagram showing basic function of non-locked type conversion of the equipment of the present system.

With reference to FIGS. 5 and 6, a manner of determining a pair of input and output fields and processes of the non-locked type conversion system will be explained in case of the forward conversion.

FIG. 5 is a time chart for illustrating a manner of determining a pair of input and output fields. Successive pairs of input and output fields $P_1 \rightarrow Q_1$, $P_2 \rightarrow Q_2$. . . are determined in such a manner that phase differences between input and output fields to be paired are at least 50H'' and does not exceed an amount of delay possessed by the device. Here, H'' is given by the following equation:

$$H'' = 6H''_o - 5H_o$$

wherein, $H'_o$ is a nominal horizontal scanning period of the 625/50 standard and $H_0$ is a nominal horizontal scanning period of the 525/60 black and white standard. Hereinafter, H'' is called as a line conversion unit period.

The phase difference between paired input and output fields must be at least 50H'', because during one field period a line deletion must be effected 50 times.

If a pair of fields $P_4 \rightarrow Q_4$ is selected, then the phase difference between them would be smaller than 50H''. Therefore, after a pair of fields $P_3 \rightarrow Q_3$ is formed, a pair of fields $P_3 \rightarrow Q_4$ is selected by using the input field $P_3$ twice. Then, pairs of fields $P_4 \rightarrow Q_5$, $P_5 \rightarrow Q_6$ . . . are determined. With respect to pairs of fields thus determined, the conversion will be carried out as explained below.

FIG. 6 shows the conversion processes of the forward direction. At first, starting points P, Q of paired input and output fields are measured and a time difference $SU = Q - P$ is derived. The time difference SU is divided by a field conversion delay time unit ΔV. An integral quotient $SF_0$ determines an initial state or condition of the field conversion. Here, ΔV is given by the following equation:

$$\Delta V = V'_o - V_o = V'_o/6 = V_o/5$$

wherein, $V'_o$ is a nominal vertical scanning period of the 625/50 standard and $V_0$ is a vertical scanning period of the 525/60 black and white standard. ΔV is called as the field conversion unit period.

Then, an residue SU' produced by said integer division is further divided by the line conversion delay time unit H''. A quotient $SL_o$ of said integer division determines an initial state of the line conversion.

The functions of the field conversion and the line conversion per se are substantially same as those of the locked type conversion wherein the number of input and output fields per second is integer and the conversions are effected step by step (reducing by 1ΔV for every one field and reducing by 1H'' for every 6 lines).

In FIG. 6, a notation 0–50 means 0H''–49H'' delay and 0–6 means 0ΔV–5ΔV delay. Concerning the states (SL, SF) of the conversions, the initial states $SL_0$ and $SF_0$ are determined in accordance with the starting instants Q and P and the delay times are reduced by unit times in accordance with the progress of the conversions.

As shown in FIG. 6 the delay time of the line conversion assumes the maximum 50H'' and the delay time of the field conversion assumes the maximum 6ΔV.

In principle, the field conversion can be effected by means of 0ΔV–5ΔV delays. However, in such a case, one field of the output signal is composed of parts of two fields of the input signal, so that an image including a moving object probably produces unnatural effect to vision and also there is formed a discontinuity of time at a middle of a field. Thus, the field conversion delay time of 6ΔV is used.

Since a direction of the delays of the line and field conversions ($SF \cdot \Delta V + SL \cdot H''$) is not changed before and after the states of the line and field conversions are exchanged, the output signal of the field conversion is produced continuously before and after the delay times are exchanged.

Since the delay time of 50H'' is included in the line conversion after the delay time is exchanged, the line conversion can be continued. In this second half period of the line conversion, the delay time is reduced by 1H'' every six lines just like as the abovementioned first half line conversion. Also in the non-locked type conversion, the specific functions of the line and field conversions are the same as those of the locked type conversion. But, in the non-locked type conversion the initial values of the line and field conversions are determined dependently on each other.

That is, in most cases the initial value of the line conversion $SL_o \cdot H''$ is $SL_o < 50$, so that the delay time becomes just zero after $SL_o$ lines have been deleted and the line conversion could not be continued any more. Therefore, when the delay time $SL \cdot H''$ of the line conversion becomes zero, the delays of the line and field conversions is exchanged and the state of the field conversion is changed from $SF_o$ into $SF_o - 1$.

Figure 7:
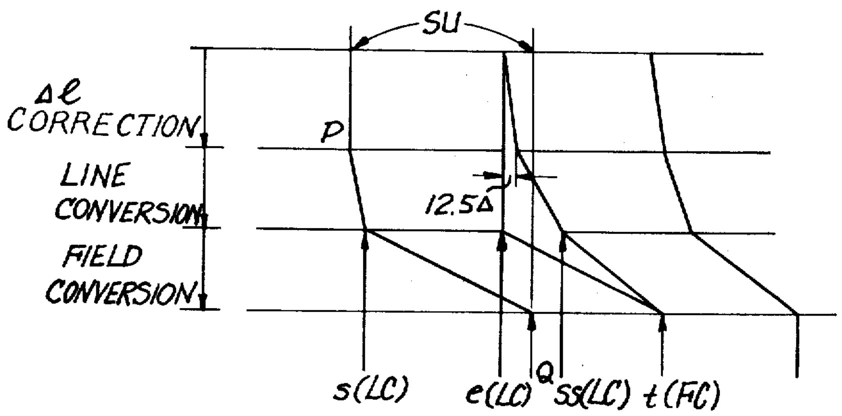
FIG. 7 is an explanatiory diagram explaining non-locked type conversion in the forward conversion.

Next, with reference to FIG. 7, a manner of setting various timings of the forward conversion of correction of scanning line difference → line conversion → field conversion will be explained. In this case the following five timing pulses are used for achieving the non-locked type control;

- a timing *s*(LC) for setting the field initial value of the line conversion,
- a timing *e*(LC) for setting the SL to 50 and for starting inhibition change of SL,
- a timing *ss*(LC) for releasing SL from state change inhibition,
- a timing *s*(FC) for setting the field initial value of the field conversion, and
- a timing *t*(FC) for changing state of the field conversion.

Among these timings, the timings *s*(LC) and *s*(FC) relate to the phase matching and the other timings relate to the exchanging of the conversions, i.e., amounts of the delay time. The timing *s*(LC) is for setting the initial value $SL_0$ of the line conversion. The timings *e*(LC) and *ss*(LC) correspond to start and end points of the unnecessary signal period produced by the line conversion, respectively. Mainly the timing *e*(LC) is used for setting the delay time of the line conversion to its initial value (50H'') of the second half period and for holding the control circuit during a time period from *e*(LC) to *ss*(LC) so as to limit the value of SL within 0–50. The timing *s*(FC) is for setting the delay time of the field conversion to its initial value $SF_o$.

The timing *s*(LC) for setting the initial value of the first half period of the line conversion can be directly determined by the initial value $SL_0$ of the line conversion in accordance with the following equation:

$$s(LC) = P + SL_o \times H''$$

In the locked type conversion, $SL_0$ is fixed to 50, but in the non-locked type conversion, $SL_0$ varies within a range of 0–50 in accordance with the progress of time. When the line conversion is started at a condition $SL_0$  50, the delay time becomes zero before 262.5 lines are treated and at this time the line conversion is ended. This instant is set as the timing *e*(LC) of the end of the first half period of the line conversion. However, the whole line conversion has not yet been completed. Thus, the delay time of 50H'' is set again and the second half period of the line conversion is started. Between the field conversion delay time unit ΔV and the line conversion delay time unit H'', there exists the following relation:

$$\Delta V = 50H'' + 12.5\,\Delta$$

wherein, Δ is a time difference between the nominal horizontal scanning period $H'_o$ of the input 625/50 signal and the nominal horizontal scanning period $H_0$ of the output 525/60 signal. Thus, 12.5Δ has been introduced in the correcting stage for the difference in length of the scanning line followed by the line converting stage and the timing *ss*(LC) for starting the second half period of the line conversion is set by adding 50H'' delay time to said 12.5Δdelay time.

Now the timing for setting the field conversion will be explained. The timing $s(FC)$ for setting the initial value $SF_0$ of the field conversion is determined by the following equation:

$$s(FC) = s(LC) + SF_0 \times \Delta V$$

In the forward conversion, $s(FC)$ is located near Q within a few line length difference. Then, Q may be used instead of said $s(FC)$. At the output of the field conversion, the end point of the first half period of the line conversion must be coincide with the start point of the second half period of the line conversion and the field converted signal must be continuous. To this end, the delay time of the signal after the second half period of the line conversion is reduced by $1\Delta V$ so as to remove the unnecessary signal period of the output of the line conversion during the field conversion. In order to effect such change in the delay time, the timing $t(FC)$ [$t(FC) = e(LC) + SF_0 \times \Delta V$] for advancing in a stepwise manner the state of the field conversion from $SF_0$ to $SF_0-1$ is set. As described above, each state is set by means of the above five timings so as to carry out the non-locked type conversion. Among these timings, some of them, particularly the timings $e(LC)$ and $ss(LC)$ may be omitted when a suitable control method is applied.

Next the general operation of the non-locked type conversion will be explained.

Figures 8A, 8B, 9, 10:
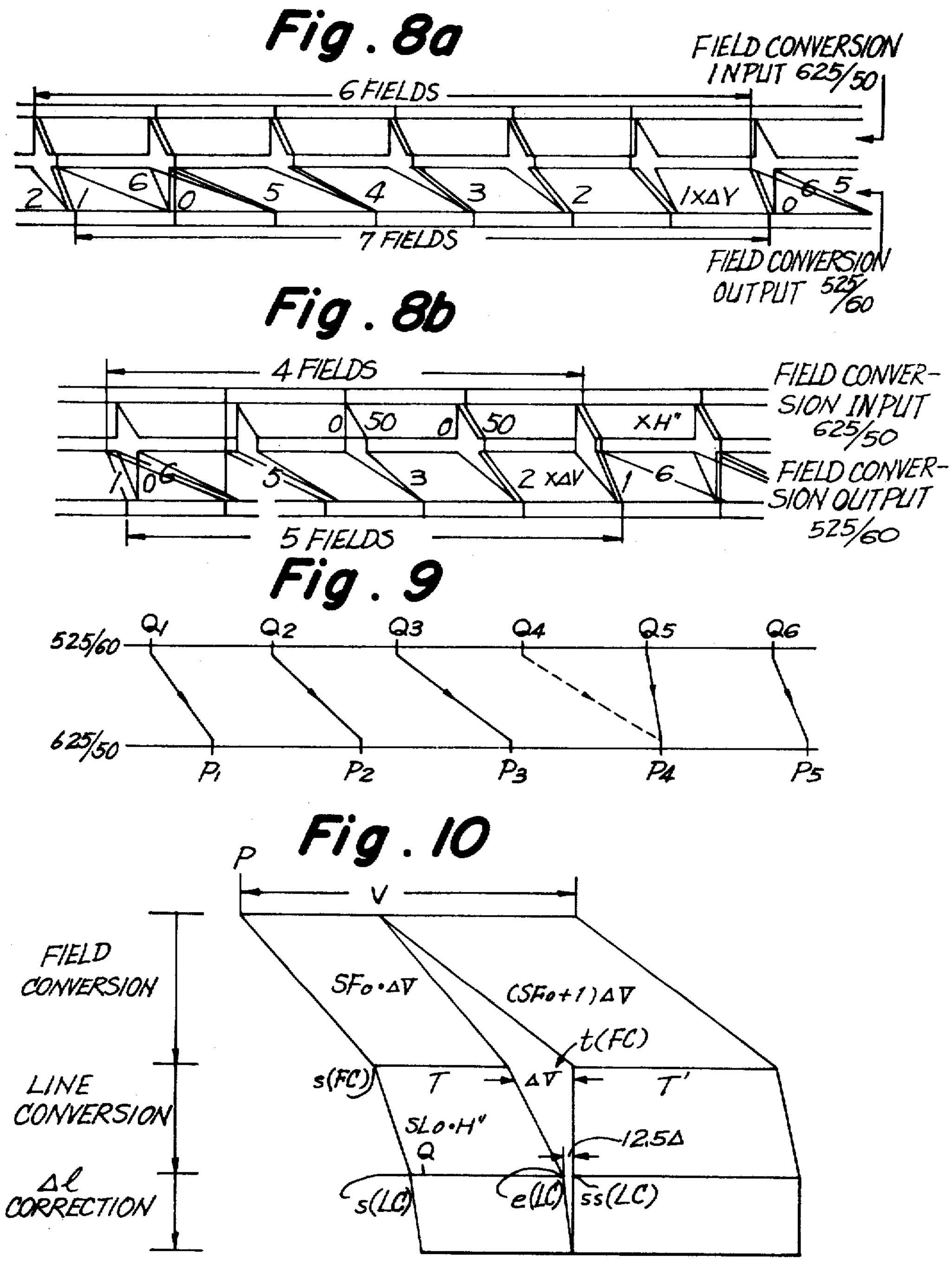
FIGS. 8*a* and 8*b* are the time charts explaining the converting operation of the equipment of the present invention.
FIG. 9 is an explanatory diagram for deciding the input and output field pair in case of reverse conversion.
FIG. 10 is an explanatory diagram for the non-locked type conversion in case of backward conversion.

A great difference between a case wherein the ratio of the input and output fields is integer and a case wherein SAID ratio is not integer is that in the former case the initial value $SL_0$ of the line conversion is fixed to 50, but in the latter case $SL_0$ varies within the range of 0–50. Therefore, in the latter case, the unnecessary signal period of a length of $1\Delta V$ is introduced at a middle of the field and the state of the filed conversion is also changed in accordance therewith. Depending on relative positions of starting points of the input and output fields $SL_0$ is changed and also position of the unnecessary signal period is varied. In the non-locked type conversion, usually the field conversion is effected with a field number ratio of 5:6, but when the unnecessary signal period is varied to go beyond a boundary of the fields, the field conversion is carried out in a ratio of 6:7 (see FIG. 8*a*) or 4:5 (see FIG. 8*b*). FIG. 8*a* shows a time chart when a ratio of the field periods is larger than 5/6, that is $$\text{output field period/input field period} > 5/6$$

In such a case, the initial value of the line conversion is progressively increased (however, in some cases the initial value is same as that of the preceding field). After the initial value $SL_0$ increases to 50, $SL_0$ becomes zero at a next step, but this decrement is compensated by the increment of the unit period of $\Delta V$ in the field converter. That is in FIG. 6 the value ($SF_0$:$SL_0$) changes as (4:49) → (3:49) → (2:50) → (2:0) → (1:0) and the initial value of the whole delay time of each field is progressively reduced by substantially 50H''. Since in the above case, the field of $SF_0$=2 appears successively two times, the conversion is effected with a ratio of 6:7 instead of 5:6 so as to compensate the "slipping" between input and output fields.

On the other hand, in case of $$\text{output field period/input field period} < 5/6,$$

$SL_0$ is progressively decreased and after it reaches zero, $SF_0$ is reduced to $SF_0$–2, so that the conversion is effected with a ratio of 4:5.

For the conversion of 6:7 or 4:5, any indication for changing the conversion ratio is not specially necessary and the changing of the conversion ratio can be performed automatically by means of the above explained setting of input and output field ratio and the non-locked type conversion processes. Thus, the ratio of input and output fields is not fiexed to 5:6 and even when said ratio is not integer, the conversion locked to the output synchronizing signal can be carried out.

Now the reverse conversion from 525/60 system to 625/50 system will be explained.

FIG. 9 is a time chart for illustrating a manner for determining paired input and output fields. As shown in the drawing, subsequent pairs $Q_1 \rightarrow P_1$, $Q_2 \rightarrow P_2$ . . . are determined in such a manner that a phase difference between input and output fields is smaller than about $5\Delta V$. This is necessary in order not to make the phase difference negative in the next field conversion. If a pair of $Q_4 \rightarrow P_4$ is selected, the phase difference exceeds $5\Delta V$, so that in such a case a pair of $Q_5 \rightarrow P_4$ is determined without using $Q_4$. For these pairs of input and output fields, the conversion processes are carried out in the following manner.

Also in the backward conversion, as shown in FIG. 6 the states $SF_0$ and $SL_0$ of the field and line conversions are derived from the phase difference SU(SU = P − Q) by the integer divisions with $\Delta V$ and H'', respectively. The initial values of the field and line conversions are set to $SF_0$ and $SL_0$, respectively. In the backward conversion the initial values $SL_0$ and $SF_0$ are increased one by one in accordance with the progression of the conversion.

As shown in FIG. 10, in the backward conversion, the field conversion is first carried out and then the line conversion is effected, so that a timing relating to the field conversion, that is the timing $s(FC)$ for setting the initial value of the field conversion is first necessary. This timing $s(FC)$ is set on the basis of the initial state $SF_0$ of the field conversion and can be derived as follows:

$$s(FC) = P + SF_0 \times \Delta V.$$

As shown in FIG. 10, after a time period of $$T\left[T \cong \left(1-\frac{SL_0}{50}\right)V\right]$$

has been elapsed from the timing $s(FC)$, the delay time of the line conversion amounts to 50, so that at this time the delay time of the conversion must be exchanged. The exchange of the delay time in case of the backward conversion is to transmit the state of the line conversion to the field conversion. That is, the state of the field conversion is changed from $SF_0$ to $SF_0 + 1$. Also in this case, since an unnecessary signal period of $\Delta V$ is introduced, the timing $t(FC)$ for changing the field conversion may be set at any time within said unnecessary signal period from P+$s(FC)$+T to P+$s(FC)$+T+$\Delta V$, the timing $s(LC)$ for setting the initial value of the line conversion is set at $s(LC)$=$s(FC)$+$SL_0$×H'' on the basis of $SL_0$. This timing $s(LC)$ is a start point of the line conversion and set by the quotient $SL_0$ derived from the integer division of H'', so that it deviates from the start point Q of the output field signal by a time period corresponding to a residue of the integer division. This deviation of time may be corrected by the time error correction which will be explained later. The timing $e(LC)$ of end of the first half period of the line conversion is determined by $e(LC)$=P+$s(FC)$+T+50H''. The timing $ss(LC)$ of the start of the second half period of the line conversion is later than $e(LC)$ by an amount of 12.5Δ. A space between $e(LC)$ and $ss(LC)$ is small and is fixed, so that in practice $ss(LC)$ may be easily derived from $e(LC)$.

The discontinuity of said 12.5Δ period after the line conversion is compensated by the succeeding correction for scanning line length difference. This discontinuity may be compensated by the time error correction. In this manner the backward conversion can be performed. Also in this case the ratio of input and output field frequencies may be arbitrary.

The method of the non-locked type conversion has been explained hereinbefore. Relatively small time errors introduced in processes of the conversion must be corrected. Since the phase matching between input and output fields is effected with the minimum unit time of H'', a time correction for a time period smaller than said unit H''a correction for a difference between input and output field length appearing at an output of the line conversion, a correction for time difference between a length of a field to be used twice and a delay time of the field conversion and a correction for a deviation of delay lines are effected by means of a variable delay circuit in the time error correcting stage.

Now the constructions and operation of each stage of the signalling device and controlling device will be explained in detail.

LINE INTERPOLATION

In the line conversion, each six scanning lines of the input 625/50 system are converted into five scanning lines of the output 525/60 system by deleting one of the six scanning lines, and such deletion of the scanning line causes geometrical distortion of the picture at the deleted portion and the continuity of the picture is lost.

Figure 11A:
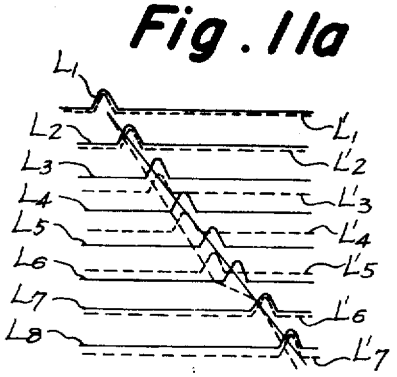
FIGS. 11*a*, 11*b* and 11*c* are explanatory diagrams for the line interpolating operation.

For instance, as shown in FIG. 11a a picture consisting of an inclined straight line shown by a solid line is reproduced as a bent line shown by a dotted line after the line conversion.

Figure 11B:
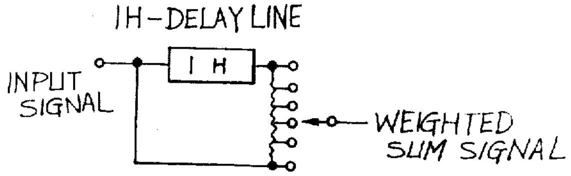
Figure 11C:
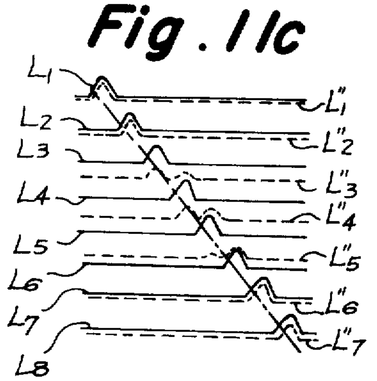

In order to avoid such distortion, a weighted line interpolator consisting of a 1H-delay line and a weighted adder, as shown in FIG. 11*b*, is used. In the illustrated line interpolator, an undelayed line and a 1H-delayed line are added with different weighted ratios, such as 0, 0.25, 0.5, 0.75 and 1.0 to produce a mean value. With such a weighted line interpolation, the converted line has a mean value of the adjacent two lines. Accordingly, the input straight line picture can be reproduced substantially as a stragiht line without any significant distortion after the TV standard system conversion, as illustrated in FIG. 11*c* by a dash and dot line.

The chrominance signal line interpolation will now be described in detail. The SECAM chrominance signal separated by the luminance-chrominance separator 5 shown in FIG. 2 has blue color difference signals B-Y on odd scanning lines of the first and second fields, and red color difference signals R-Y on even scanning lines thereof. Both color difference signals are in the form of 4 MHz FM signal. On the contrary, in the third and fourth fields, the R-Y signals are on odd scanning lines and B-Y signals are on even scanning lines. In case of accurate SECAM standard signal, color discriminating signals are superposed in the nine lines in the vertical flyback period for checking the parity of lines on which the B-Y and R-Y signals are inserted.

Table 1 shows the disposition of the input SECAM chrominance signals as well as the chrominance signal disposition in the converted output signal. For simplicity's sake, the B-Y signals and R-Y signals are represented by B and R in the table, respectively. For instance, there is a B-Y signal on the 23rd line of the first field, while the 340th line of the second field carries an R-Y signal. In the SECAM system, after the 625th line of the fourth field, the scanning comes back to the first line of the first field. The canning lines 1 22 of the first and third fields and the scanning lines 314 to 335 of the second and fourth fields are in the vertical flyback period and do not appear on the screen of the television receiver.

In the line conversion, the 625 lines of the 625/50 system are reduced to 525 lines of the 525/60 system by deleting 50 lines per field. The conversion is carried out by deleting one line from each six lines, starting from the 18th line of the 625/50 system. In order to retain the color sequence of the input signal in the line converted signal, the output from the chrominance line interpolator, which is fed to the line converter, should be so switched that the sequence of the chrominance signal in the even and odd lines of the input signal is retained in successive six lines, but is reversed in the next successive six lines. Table 1 shows the line numbers of the converted signals together with the chrominance signal carried by each lines of the converted signal. It is apparent from Table 1 that in the input signal, the six successive scanning lines starting from the multiple of 12 (with * mark in Table 1) have their chrominance signals retained without reversing, respectively. On the other hand, the other successive six scanning lines of the input signal between the last-mentioned successive six scanning lines, which start from odd multiples of six (with ° mark in Table 1), have their chrominance signals reversed (i.e., R $\rightarrow$ B, B $\rightarrow$ R), respectively. The line interpolation according to the present invention includes such switching of the chrominance signal.

In order to fulfil proper interlaced scanning in the converted signal, the line interpolation is applied to the input signal in such a manner that the interlace interpolation can be compensated. The process of line interpolation is effected in such a manner that the scanning lines are prepared for the shift of the picture position to be caused at the field setter 11 shown in FIG. 2. The field setter 11 is to readjust the timing of the interlace setting which will be changed at the field converter 12. To this end, the line interpolation is conducted so that the weight position of the line interpolation is shifted by H/2 (H being time from start of one scanning line to start of next scanning

TABLE 1

| | First field | | | | | | | | Second field | | | | | | | | Third field | | | | | | | | Fourth field | | | | | | | |
|---|---|---|---|---|---|---|---|---|---|---|---|---|---|---|---|---|---|---|---|---|---|---|---|---|---|---|---|---|---|---|---|---|
| Generalized line No. | Input line No. | Input line chrominance signal | Line No. after line conversion | Converted line chrominance signal | Input line No. | Input line chrominance signal | Line No. after line conversion | Converted line chrominance signal | Input line No. | Input line chrominance signal | Line No. after line conversion | Converted line chrominance signal | Input line No. | Input line chrominance signal | Line No. after line conversion | Converted line chrominance signal |
| | 1 | B | 1 | B | 314 | R | 264 | R | 1 | R | 1 | R | 314 | B | 264 | B |
| | 2 | R | 2 | R | 315 | B | 265 | B | 2 | B | 2 | B | 315 | R | 265 | R |
| | . | . | . | . | . | . | . | . | . | . | . | . | . | . | . | . |
| | 17 | B | 17 | B | . | . | . | . | 17 | R | 17 | R | . | . | . | . |
| 12n−6 | °18 | R | | | °330 | R | | | °18 | B | | | °330 | B | | |
| 12n−5 | 19 | B | 18 | R | 331 | B | 280 | R | 19 | R | 18 | B | 331 | R | 280 | B |
| 12n−4 | 20 | R | 19 | B | 332 | R | 281 | B | 20 | B | 19 | R | 332 | B | 281 | R |
| 12n−3 | 21 | B | 20 | R | 333 | B | 282 | R | 21 | R | 20 | B | 333 | R | 282 | B |
| 12n−2 | 22 | R | 21 | B | 334 | R | 283 | B | 22 | B | 21 | R | 334 | B | 283 | R |
| 12n−1 | 23 | B | 22 | R | 335 | B | 284 | R | 23 | R | 22 | B | 335 | R | 284 | B |
| 12n | *24 | R | | | *336 | R | | | *24 | B | | | *336 | B | | |
| 12n+1 | 25 | B | 23 | B | 337 | B | 285 | B | 25 | R | 23 | R | 337 | R | 285 | R |
| 12n+2 | 26 | R | 24 | R | 338 | R | 286 | R | 26 | B | 24 | B | 338 | B | 286 | B |
| 12n+3 | 27 | B | 25 | B | 339 | B | 287 | B | 27 | R | 25 | R | 339 | R | 287 | R |
| 12n+4 | 28 | R | 26 | R | 340 | R | 288 | R | 28 | B | 26 | B | 340 | B | 288 | B |
| 12n+5 | 29 | B | 27 | B | 341 | B | 289 | B | 29 | R | 27 | R | 341 | R | 389 | R |
| 12n+6 | °30 | R | | | °342 | R | | | °30 | B | | | °342 | B | | |
| | 31 | B | 28 | R | 343 | B | 290 | R | 31 | R | 28 | B | 343 | R | 290 | B |
| | . | . | . | . | . | . | . | . | . | . | . | . | . | . | . | . |
| | 311 | B | 262 | R | 623 | B | 524 | R | 311 | R | 262 | B | 623 | R | 524 | B |
| | *312 | R | | | *624 | R | | | *312 | B | | | *624 | B | | |
| | (½)313 | B | (½)263 | B | 625 | B | 525 | B | (½)313 | R | (½)263 | R | 625 | R | 525 | R |

Note.—
1. * indicates that succeeding five lines of output signal retain the same sequence of chrominance signal of the input signal after the chrominance signal line interpolation.
2. ° indicates that succeeding five lines of output signal have the reverse sequence of chrominance signal of the input signal afte^r the chrominance signal line interpolation.
3. ½ represents the last scanning line of a field, whose duration is one-half of other scanning lines of the field.

line), whereby after the field conversion, the center of interpolation is prepared for alignment with H/2-delay to be switched by the field setter 11 at 5 Hz.

Figure 12:
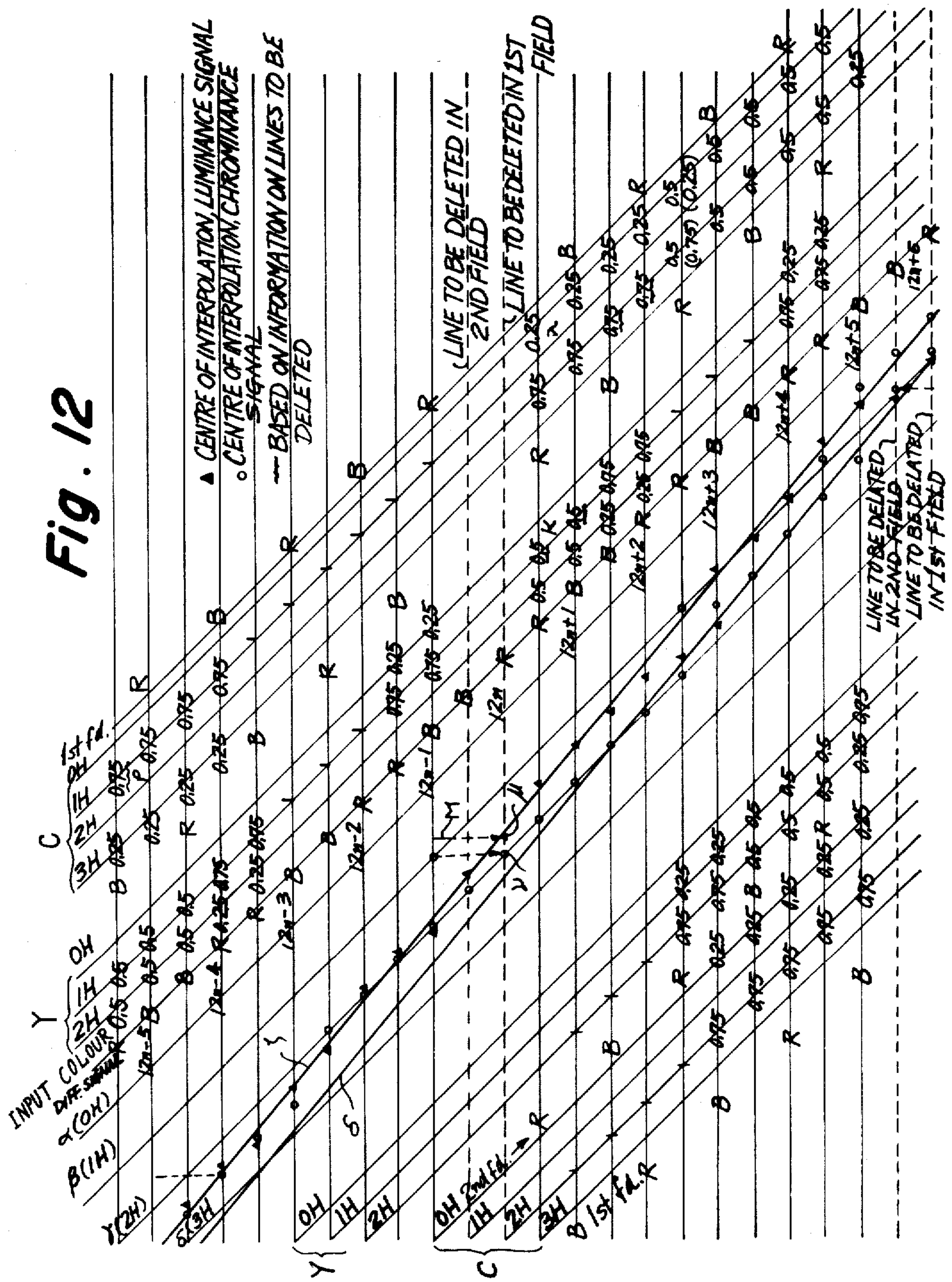
FIG. 12 is an explanatory diagram for the line interpolation.

FIG. 12 illustrates the process of luminance line interpolation and chrominance line interpolation, considering the aforesaid factors. In the figure, a 45°-inclined line $\alpha$ (OH) represents an input signal, and numerals $12_{n+i}$ ($n$ being an integer, $i$=0, ±1, ±2 . . . ±11) on the line $\alpha$ represent the scanning line number in the first field. The sequence of the chrominance signals is shown to the right of the numerals. In FIG. 12, the sequence of the chrominance signals in the second field is shown between the adjacent scanning lines of the first field. Since the input signal is depicted by the 45°-slant line, the converted output signal from the line converter, which is made by deleting one scanning line from each successive six scanning lines of the input signal, can be shown by a line whose gradient is reduced by one sixth of that of the input line $\alpha$. The signals delayed from the input signal by 1H, 2H, and 3H are represented by °-slant lines $\beta$, $\gamma$, and $\delta$, respectively, which are parallel with the line $\alpha$. Lines $\zeta$ and $\eta$ are loci of the centers of interpolation after the line conversion. The line $\zeta$ is apart from the line $\eta$ by a distance of H/2, and the two lines correspond to signals with and without H/2-delay, respectively. There are innumerable lines parallel with the lines $\zeta$ and $\eta$, but when the line interpolation is done with two 1H-delay lines for luminance signals and with three 1H-delay lines for chrominance signals, which are the minimum numbers of 1H-dealy lines for the line interpolation, two loci of the centers of interpolation with a H/2 spacing converge into the lines $\zeta$ and $\eta$ in most cases.

The ratio for the weighted interpolation is determined as follows. For instance, the center of interpolation on the line $\zeta$ for the scanning line $12_{n+1}$ is between the lines $\beta$(1H) and $\gamma$(2H), and hence the luminance signal interpolation can be done by adding the 1H-delayed signal and the 2H-delayed signal at a 0.5:0.5 ratio. As regards the chrominance signal, the scanning line $12_{n+1}$ carries B-Y signal, and hence, the 2H-delayed line carries B-Y signal at the corresponding point while the 1H- and 3H-delayed lines carry R-Y signals at the corresponding points, respectively. As shown in Table 1, the scanning lines $12_{n+1}$ to $12_{n+5}$ should retain their sequence of chrominance signals in the converted lines. Accordingly, for the $12_{n+1}$ scanning line, the line interpolation is conducted by adding the undelayed signal (0H) and the 2H-delayed signal at a ratio of 0.75:0.25. The aforesaid ratio for the weighted interpolation of the luminance signal and the chrominance signal are shown at points $\kappa$ and $\lambda$ of FIG. 12.

As indicated in FIG. 12, the scanning lines $12_n$, $12_{n\pm6}$ . . . are deleted in the course of line interpolation. In the line interpolation, the signal is delayed by 50H in the beginning prior to the deletion of 50 scanning lines, and the delay time is reduced by 1H each time a scanning line is deleted, so that a continuous signal can be generated at the output of the line interpolator. In other words, the scanning lines $12_{n-6}$ to $12_{n-1}$ are 1H more delayed than the scanning lines $12_n$ to $12_{n+5}$. Thus, the ratio for weighted interpolation of an arbitrary scanning line, for instance the line $12_{n-1}$, is determined as follows. The center of interpolation for the scanning line $12_{n-1}$ is delayed from the line $12_n$ by 1H, and hence, the center of interpolation is on the $12_n$ line, as shown by the dotted line arrow M in FIG. 12. It means that the desired center of interpolation for the luminance signals is on the scanning line $12_n$ at, or in the proximity of, the intersection with the line $\zeta$, that is the point $\mu$. The point $\mu$ divides the line section $12_n$ between the 45°-slant lines $\beta$ and $\gamma$ at a ratio of 0.75:0.25, which ratio can easily be achieved in the weighted addition in the device of the invention. To obtain such center of interpolation, it is necessary to add the 1H-delayed signal and the undelayed signal on the line $12_{n-1}$ at a ratio of 0.75:0.25. As regards the chrominance signal, the sequence of chrominance signals in the scanning lines $12_{n-6}$ to $12_{n-1}$ of the input signal should be reversed in the output signal, and more particularly, the B-Y and R-Y signals in the input signal should be replaced by R-Y and B-Y signals, respectively. On the subject $12_{n-1}$ scanning line, the input chrominance signal is B-Y, but the interpolation should be made for R-Y signals, and hence, the center of interpolation for the chrominance signal should be at a point close to the aforesaid point $\mu$, as shown by the circled point $\nu$ in FIG. 12. This means that the 1H-delayed signal of the scanning line $12_{n-1}$ is used to 100 percent. On the other hand, for the scanning line $12_{n-5}$ having a B-Y chrominance signal, the chrominance signal line interpolation should be done by adding the 1H-delayed signal and the 3H-delayed signal at a ratio of 0.75:0.25, as shown by the point $\rho$ in FIG. 12.

Table 2 shows the weight ratio of signals to be added in the weighted line interpolation of arbitrary 12 scanning lines, which are determined by the aforesaid manner. In Table 2, those scanning lines which are delayed by H/2 at the field setter are listed in the upper half of the table, while those which are not delayed are listed in the lower half of the table. The underlines in Table 2 mean that the underlined values utilize information carried by the scanning lines to be deleted in the line conversion.

TABLE 2

| Group | Input line No. | First field | | | | | | | | Second field | | | | | | | |
|---|---|---|---|---|---|---|---|---|---|---|---|---|---|---|---|---|---|
| | | Weighted ratio for luminance signal interpolation | | | Weighted ratio for chrominance signal interpolation | | | | | Weighted ratio for luminance signal interpolation | | | Weighted ratio for chrominance signal interpolation | | | | |
| | | 2H | 1H | 0H | 3H | 2H | 1H | 0H | C | 2H | 1H | 0H | 3H | 2H | 1H | 0H | C |
| To be ½H-delayed at field setter. | 12n−5 | 0.5 | 0.5 | | 0.25 | | 0.75 | | R | 0.5 | 0.5 | | 0.25 | | 0.75 | | B |
| | 12n−4 | 0.25 | 0.75 | | 0.25 | | 0.75 | | B | 0.5 | 0.5 | | 0.25 | | 0.75 | | R |
| | 12n−3 | | 1 | | | | 1 | | R | 0.25 | 0.75 | | | | 1 | | B |
| | 12n−2 | | 1 | | | | 1 | | B | | 1 | | | | 1 | | R |
| | 12n−1 | | 0.75 | 0.25 | | | 1 | | R | | 0.75 | 0.25 | | | 1 | | B |
| | 12n | To be deleted | | | | | | | | To be deleted | | | | | | | |
| | 12n+1 | 0.5 | 0.5 | | | 0.75 | | 0.25 | B | 0.5 | 0.5 | | | 0.75 | | 0.25 | R |
| | 12n+2 | 0.25 | 0.75 | | | 0.75 | | 0.25 | R | 0.5 | 0.5 | | | 0.75 | | 0.25 | B |
| | 12n+3 | | 1 | | | 0.5 | | 0.5 | B | 0.25 | 0.75 | | | 0.5 | | 0.5 | R |
| | 12n+4 | | 1 | | | 0.5 | | 0.5 | R | | 1 | | | 0.5 | | 0.5 | B |
| | 12n+5 | | 0.75 | 0.25 | | 0.25 | | 0.75 | B | | 0.75 | 0.25 | | 0.5 | | 0.5 | R |
| Not to be delayed at field setter. | 12n−5 | 1 | | | 0.5 | | 0.5 | | R | 1 | | | 0.5 | | 0.5 | | B |
| | 12n−4 | 1 | | | 0.5 | | 0.5 | | B | 1 | | | 0.5 | | 0.5 | | R |
| | 12n−3 | 0.75 | 0.25 | | 0.25 | | 0.75 | | R | 0.75 | 0.25 | | 0.5 | | 0.5 | | B |
| | 12n−2 | 0.5 | 0.5 | | 0.25 | | 0.75 | | B | 0.5 | 0.5 | | 0.25 | | 0.75 | | R |
| | 12n−1 | 0.25 | 0.75 | | 0.25 | | 0.75 | | R | 0.5 | 0.5 | | 0.25 | | 0.75 | | B |
| | 12n | To be deleted | | | | | | | | To be deleted | | | | | | | |
| | 12n+1 | 1 | | | | 1 | | | B | 1 | | | | 1 | | | R |
| | 12n+2 | 1 | | | | 1 | | | R | 1 | | | | 1 | | | B |
| | 12n+3 | 0.15 | 0.25 | | | 0.75 | | 0.25 | B | 0.75 | 0.25 | | | 1 | | | R |
| | 12n+4 | 0.5 | 0.5 | | | 0.75 | | 0.25 | R | 0.5 | 0.5 | | | 0.75 | | 0.25 | B |
| | 12n+5 | 0.25 | 0.75 | | | 0.75 | | 0.25 | B | 0.5 | 0.5 | | | 0.75 | | 0.25 | R |

NOTE.—Underlined information is carried by scanning lines to be deleted.

The weighted addition for the chrominance signal line interpolation is performed by the aforesaid frequency-modulated interpolating system, and the center of interpolation is approximated at specific five points; namely, at points corresponding to the ratios 0.5:0.5, 0.25:0.75, 0.75:0.25, 1:0, and 0:1, respectively. Since each specific chrominance signal, i.e., B-Y signal or R-Y signal, is carried only by every other scanning lines, it seems to be necessary to approximate the center of interpolation more accurately, such as by providing twice as many weighted ratios. The band width of the chrominance signal, however, is actually narrower than that of the luminance signal, and the weighted addition of the chrominance signals with the same approximation as that for the luminance signals does not cause any degradation of the picture quality. The chrominance signal line interpolation is effected while delaying the center of interpolation by H/2, because the chrominance signal has less freedom of choosing the center of interpolation due to the necessity of using every other scanning lines for chrominance signal interpolation. Accordingly, the center of interpolation of the luminance signals is brought into alignment with that of the chrominance signals.

It should be noted that by conducting the line interpolation prior to the line conversion, the information carried by the lines to be deleted can be effectively utilized in the line interpolation, and the overall accuracy of the converted color TV standard system can be improved, as seen from Table 2.

Figure 13:
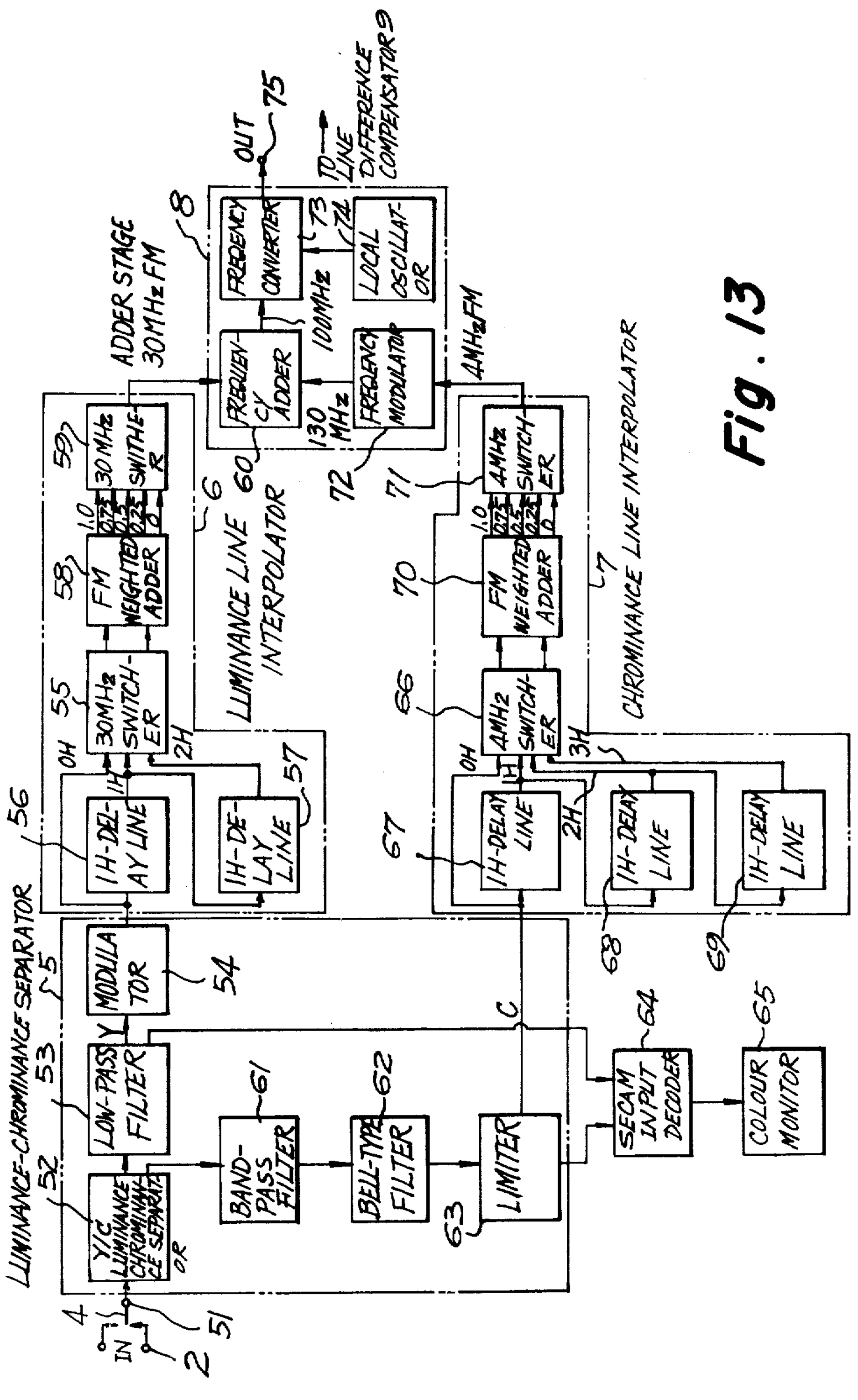
FIG. 13 is a block diagram showing detailed construction of the line interpolator.

FIG. 13 is a block diagram showing the construction of line interpolators 6 and 7, which are connected to the luminance-chrominace separator 5 on the one hand and to the adder stage 8 on the other hand. The SECAM signal delivered to an input terminal 51 is fed to a luminance-chrominance separator 52, where the SECAM signal is separated into a luminance signal Y and a chrominance signal C. The luminance signal Y is then delivered to a low-pass filter 53 and a 30 MHz modulator 54. The output from the 30 MHz modulator 54 is applied to a 30 MHz switcher 55 through three routes; namely, a direct route, a route including a 1H-delay line 56, and another route including two 1H-delay lines 56 and 57 connected in series. In other words, the three routes for applying the luminance signal Y to the 30 MHz switcher 55 act to delay the luminance signal 0H, 1H, and 2H, respectively.

The output from the switcher 55 is fed to a weighted-adder 58, which in turn produces five output signals each representing the luminance signal multiplied by a factor of 1.0, 0.75, 0.5, 0.25, or 0, respectively. Another 30 MHz switcher 59 acts to selectively deliver the output signals from the weighted-adder 58 to a frequency adder 60, as the luminance signal processed by a 30 MHz line interpolator 6.

On the other hand, the chrominance signal C separated at the separator 52 is delivered to a limiter 63 through a band-pass filter 61 and a bell-type filter 62. The 4 MHz chrominance signal from the limiter 63 is delivered to a 4 MHz switcher 66 through four routes; namely, a direct route, a route including a 1H-delay line 67, a route including two 1H-delay lines 67 and 68, and another route including three 1H-delay lines 67, 68, and 69. In other words, the 4 MHz switcher 66 receivers four kinds of chrominance signals delayed by 0H, 1H, 2H, and 3H, respectively. The output from the 4 MHz switcher 66 is applied to a weighted-adder 70, which also produces five output signals, each representing the chrominance signal multiplied by a factor of 1.0, 0.75, 0.5, 0.25, or 0, respectively. Another 4 MHz switcher 71 acts to selectively deliver one of these five output signals from the switcher 71 to a 130 MHz frequency-modulator 72. The frequency-modulator 72 produces an FM chrominance signal of 130 MHz band, which is in turn fed to the frequency adder 60.

The frequency adder 60 receives signals from the switcher 59 and the modulator 72, and produces a 100 MHz output signal, which is applied to a frequency converter 73. The frequency converter 73 also receives a 130 MHz signal from a local oscillator 74, so as to generate a 30 MHz FM output signal. The 30 MHz FM signal is delivered to an output terminal 75, which is connected to the scanning line difference compensator 9, as shown in FIG. 2.

Color TV pictures of the SECAM system can be reproduced at a color monitor 65 by receiving the luminance signals Y from the low-pass filter 53 and the chrominance signals C from the limiter 63 through a SECAM decoder 64.

It should be noted here that in the device of the present invention, the line interpolation is carried out by using frequency-modulated signals. As for the line interpolation of the luminance signal, a 30 MHz carrier is modulated by the luminance signal to produce the FM signal, so as to effect the frequency-modulated line interpolation of the luminance signal by the FM luminance signal thus prepared. In the illustrated embodiment, fused quartz delay lines were used for the 1H-delay lines of the luminance signal line interpolator 6. On the other hand, as regards the chrominance signal, if the chrominance signal of the SECAM system is to be converted into signals of another standard system, since the chrominance signal of the SECAM system is an FM signal, the FM interpolation of the chrominance signal can be carried out by using suitable delay lines, such as quartz delay lines, without using any additional frequency-modulator.

SCANNING LINE DIFFERENCE COMPENSATOR, LINE CONVERTER, FIELD SETTER, AND FIELD CONVERTER

Referring to FIG. 2, the luminance signal and the chrominance signal are added together after the line interpolation, and then fed to the scanning line difference compensator 9 as 30 MHz FM signals. The compensator 9 acts to make even the scanning line length in the converted signal, by shortening the scanning line being converted while varying the magnitude of shortening by 0.5 $\mu$s (=1Δ) per scanning line. 0.5 $\mu$s is the difference of the 64.0 $\mu$s long scanning line of the 625/50 system and the 63.5 $\mu$s long scanning line of the 525/60 system. For effecting such shortening operation, delay lines for 1Δ, 2Δ, 4Δ, 8Δ, and 16Δ are prepared, and the magnitude of delay is reduced by 1Δper line.

In the line converter 10, each signal is applied to fused quartz delay lines capable of effecting 0H to 50H delay by 1H step, and the magnitude of delay is set at 50H at the beginning of each field and then reduced by 1H each time a scanning line is deleted, so as to uniformly delete the scanning lines. Accordingly, there will be produced a 50H wide gap between adjacent fields due to the line conversion. The sum of five such gaps for five fields corresponds to the duration of one field of the 525/60 system. Thus, in the field converter 12, the delay time is shifted by 1/3000 second per field in such manner that the aforesaid five gaps can be collected in abutting relation to form a continuous gap having a duration equal to one field of the 525/60 system after conversion of each successive five fields of the 625/50 system. The fifth field of the successive five fields of the 625/50 system is inserted into the thus collected gap. In other words, the said fifth field is used twice in the converted signal.

The 1/300 second delay time can be generated either by a recording-reproducing process, in which the signal is once recorded on a magnetic disk and then reproduced with a controlled time delay, or by a process using quartz delay line. Either of the processes can be used. As described in the foregoing, prior to the field conversion, the field setter 11 acts to retain the interlace relation by using a H/2-delay line, which is switched out of circuit during certain successive five fields but switched into circuit during the next succeeding five fields.

Figure 14:
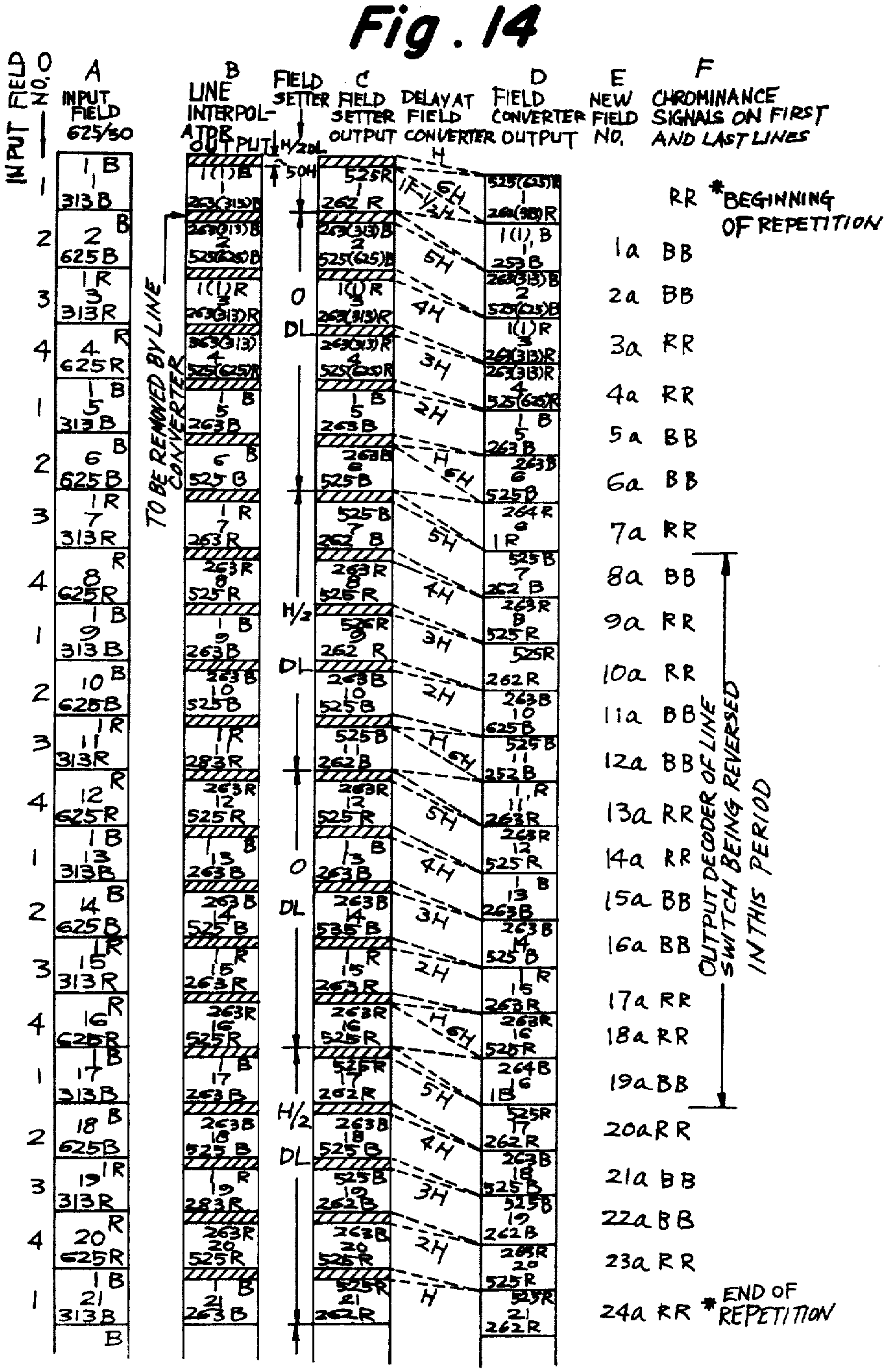
FIG. 14 is a chart showing the operations of line and field conversions.

FIG. 14 shows the sequential disposition of the chrominance signals at different stages of the color TV standard system converter up to the field converter 12 thereof. The four columns A, B, C, and D of the figure illustrate fields and specific scanning line numbers of the 625/50 system, together with the chrominance signals on the specific scanning lines at the input from the 625/50 system, at the line converter output, at the field setter output, and at the field converter output, respectively. In the 625/50 system, the odd scanning lines of the first field carry B-Y chrominance signals, while the even scanning lines of the first field carry R-Y chrominance signals. In the second field of the 625/50 system, the relation between the chrominance signals and the sequential numbers of the scanning lines is reversed. In the third field, the odd scanning lines carry the R-Y chrominance signals and even scanning lines carry the B-Y chrominance signals, while the relation is reversed in the fourth field, and so on.

As described hereinbefore, referring to the line interpolator, the color line interpolation is effected without changing the above relation between the sequence of the chrominance signal and the scanning line. Accordingly, the scanning line and the sequential disposition of the chrominance signals at the line converter output become as shown in the column B of FIG. 14. As shown in the column B of FIG. 14, there is an unnecessary period at each field of the main signal, or scanning lines, which period corresponds to the 50H-delay time provided at the beginning of each field. The 50H-delay time, of course, corresponds to the total length of 50 lines deleted. The column C of FIG. 14 illustrates the field setter output consisting of H/2-delayed signals selectively applied to successive five fields at intervals of five fields. With such H/2-delayed signals, the timing of the interlaced scanning can be correctly maintained when the aforesaid fifth field of each successive five fields of the 625/50 system is inserted into the aforesaid collected gap. As pointed out in the foregoing, the fifth signal is used twice in the converted signal.

For example, the column D of FIG. 14 illustrates how successive five fields of the 625/50 system are converted into successive six fields of the 525/60 system by using twice the scanning field No. 1, No. 6, No. 11, or No. 16 of the 625/50 system. In comparing the new converted fields No. 1*a* to No. 6*a* with the succeeding new converted fields No. 7*a* to No. 12*a* (Column E of FIG. 14), after the field conversion, the former fields are vertically lowered by H/2 in the raster as compared with the latter fields, because the center of interpolation for each line was so positioned in the course of the chrominance signal line interpolation as to ensure the desired alignment of the fields, as described hereinbefore. Thus, upon completion of the field conversion, there are produced almost perfect color TV signals of the 525/60 system, with the proper sequence of the chrominance signals. The signals thus prepared are further processed by the time error compensator 13 for correcting various time errors involved in the signals.

INTERLACE INTERPOLATION

Referring to FIG. 14, the scanning lines of those fields of the 625/50 system which are to be repeated in the 525/60 system, or the aforesaid fifth field, such as the fields No. 1, No. 6, No. 11 . . . are interlaced with, or H/2 staggered with respect to, the preceding fields, such as the fields No. 0 (not shown), No. 5 No. 10 . . . . Accordingly, mere repetition of the specific fields will cause periodical vertical jitter in the reproduced picture. To eliminate such vertical jitter, an interlace interpolator is used.

In case of luminance signals, only those fields which are to be repeated have strong correlation in vertical direction. By taking advantage of such strong corelation, new luminance signals are formed to represent the mean value of adjacent scanning lines of those fields. In case of chrominance signals, weighted addition of chrominance signals on adjacent scanning lines is meaningless, as pointed out hereinbefore referring to the line interpolation.

Figure 15:
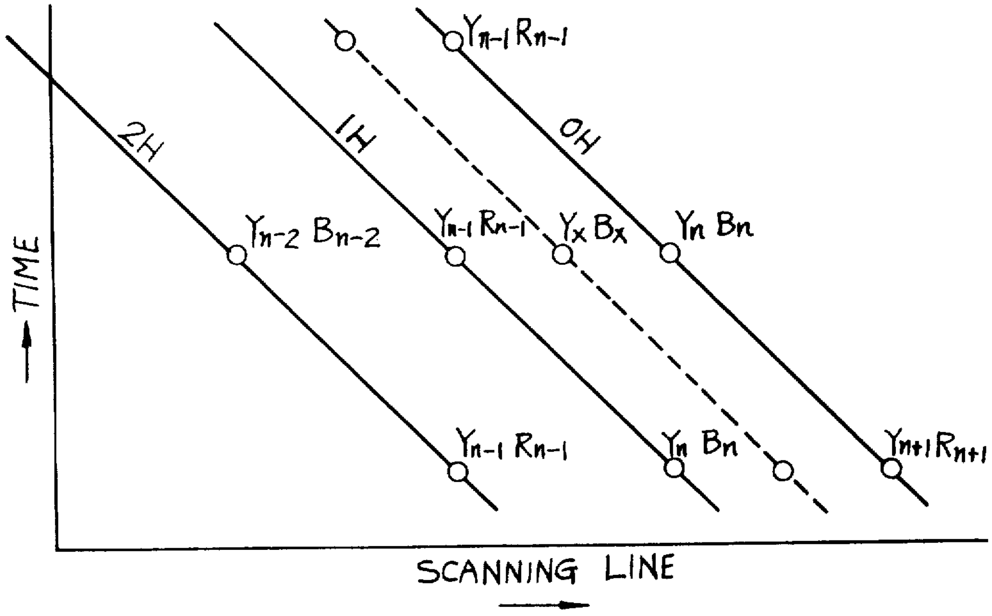
FIG. 15 is a chart indicating the operation of the interlaced interpolation.

FIG. 15 shows the process of chrominance signal interlace interpolation. If the luminance signal and the chrominance signal at an arbitrary point of an input line as shown by a slanted solid line in the figure, are represented by $Y_n$ and $B_n$, the corresponding signals in a 1H-delayed signal are located at a point directly below the aforesaid arbitrary point with a distance corresponding to the length of a scanning line. Accordingly, at the position (time) of the aforesaid signals $Y_n$ and $B_n$, the 1H-delayed output has a luminance signal $Y_{n-1}$ and a chrominance signal $R_{n-1}$, while the 2H-delayed output has a luminance signal $Y_{n-2}$ and a chrominance signal $B_{n-2}$. For luminance signals, the center of interpolation should be at the middle of adjacent scanning lines, and the interpolated signals can be represented by the dotted line of FIG. 8. As can be seen from the figure, the ratios of the luminance signals and the chrominance signals in the weighted addition, for the interlace interpolation, become as follows.

For luminance signals $Y_x=0.5Y_{n-1}+0.5Y_n$.

For chrominance signals $C_x=0.25B_{n-2}+0.75B_n$.

Figure 16:
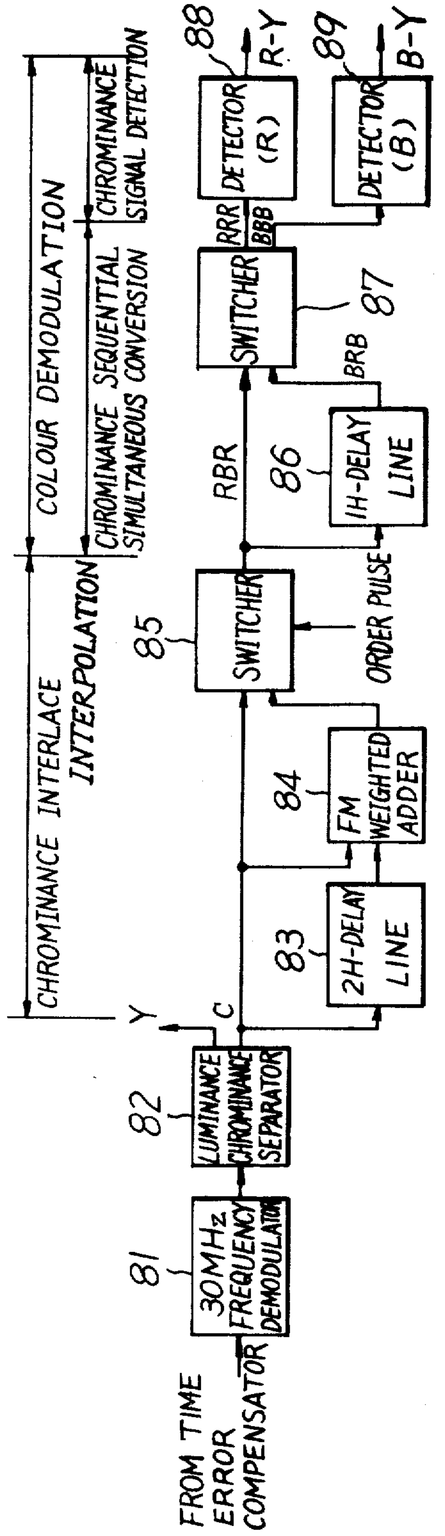
FIG. 16 is a block diagram showing the detail of the interlaced interpolator.

FIG. 16 is a block diagram, illustrating a system for chrominance signal interlace interpolation. A 30 MHz frequency-demodulator 81 receives and demodulates the 30 MHz signals from the time error compensator 13 shown in FIG. 2. The compensator 13 corrects deviations in the input synchronizing frequency and deviations in delay times of the composite signals after the field conversion. After the demodulation, a luminance-chrominance separator 82 separates the chrominance signal (4 MHz FM signal) from the luminance signal by band-separation, and delivers the chrominance signal to an interlace interpolation stage. Referring to FIG. 16 and FIG. 14, column D, fields 2–6, 7–11 . . . from the field converter 12 are applied to a switcher 85. An FM weighted-adder 84 acts to add straight field signals 1′, 6′. . . and the output signals from a 2H-delay line 83 at a ratio of 0.25:0.75. The 2H-delay line 83 delays the field signals 1′, 6′ . . . by 2H, respectively. The output from the FM weighted-adder 84 is delivered to the switcher 85. The switcher 85 selectively completes an upper route in FIG. 16 and a lower route in the figure. During the period of time for the fields to be repeated, e.g., 1′, 6′, 11′ . . . the switcher 85 completes the lower routes, while during other fields, the switcher 85 completes the upper route. Order or command pulses for actuating such switching operation of the switcher 85 can be the same as that in the luminance signal interlace interpolator.

The demodulation of the chrominance signals is essentially identical with that for a SECAM decoder. In FIG. 16, a 1H-delay line 86 and a double-pole double-throw switcher 87 cooperate with each other for generating a pulse for each scanning line, so as to convert the sequential signal into simultaneous signals. Thereby, continuous R-Y signals or continuous B-Y signals are generated in the form of 4 MHz FM signals. By demodulating the 4 MHz FM signals thus generated by detectors 88 and 89, red color difference signals and blue color difference signals are achieved. Order pulses to be applied to the double-pole double-throw switcher 87 can be any signals which effect the switching operation at ½ × 15.75 KHz, because the sequence of the chrominance signals is properly maintained in the converted signals. However, the sequence of chrominance signals in the converted new fields changes periodically at a 24 field cycle, as shown in FIG. 14, columns D and E. In other words, the sequence of the chrominance signal in the first successive 12 fields in each successive 24 fields is contrary to that in the second successive 12 fields therein. The new fields 8*a*–19*a* of FIG. 14, column E, have their sequence of chrominance signals reversed. To this end, the output decoder line switcher 87 should be reversed at the beginning of the 8th and 20th fields. The 8th and 20th fields are not only next to those fields which are repeated fin the field conversion, but also next to the specific repeated fields whose chrominance signals are different from the chrominance signals of input fields corresponding to the specific repeated fields (for instance, next to the converted fields 1*a* and 7*a*, respectively). Since the aforesaid specific repeated fields appear periodically at a twelve field interval, the order signal pulse for the aforesaid reversion of the double-pole double-throw switcher 87 can be generated in response to the detection of the above specific repeated fields.

The red color difference signal and the blue color differnence signal thus generated are delivered to the NTSC encoder 20 as shown in FIG. 2, so that a chrominance subcarrier can be frequency-modulated by the two color difference signals at a 90° phase difference, respectively.

On the other hand, after the time error compensation, the luminance signals are delivered through a separate interlace interpolator 15 and a processor 18, and then fed to the NTSC encoder 20 in synchronism with the chrominance signals.

The standard SECAM signal has chrominance identification marks distributed over nine lines in the vertical flyback period. The chrominance identification marks can be gated at the input in order to use them as the reference for later sequential disposition of the chrominance signals and other controls. In the converter according to the present invention, the sequence of the chrominance signals are not changed until the completion of the conversion. Accordingly, the chrominance identification marks can be used until the aforesaid order signals are given to the double-pole double-throw switcher 87 of the final decoder of the chrominance signal. If the input SECAM signal has a large S/N ratio, the control system of the converter according to the present invention can somewhat be simplified, by dispensing with various interpolations during the vertical flyback period.

FIELD INTERPOLATION

As pointed out in the foregoing, with the field conversion in the converter of the present invention, five fields of the input 625/50 system are converted into six fields of the output 525/60 system by using twice every fifth fields of each successive five fields of the former system. Such repetition will cause a discontinuity in the movement in the picture. In order to eliminate such discontinuity, weighted addition is effected on adjacent fields, covering 2–4 fields preceding the field to be repeated, so that the smooth movement in the picture can be ensured.

Figure 17:
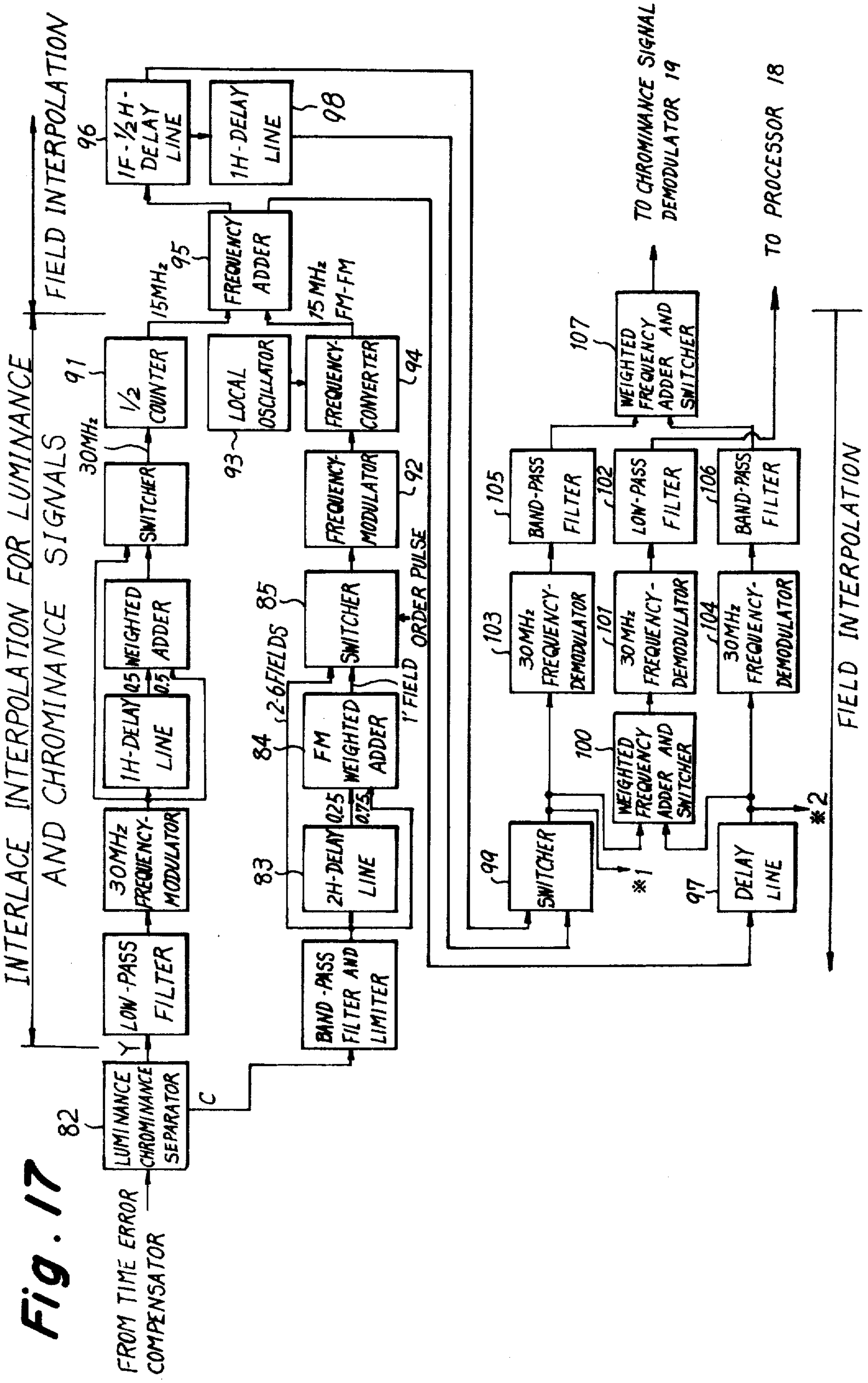
FIG. 17 is a detailed block diagram showing the interlaced interpolator and the field interpolator.

FIG. 17 illustrates an example of systems for effecting weighted addition of fields that is the field interpolation. The field interpolation is carried out at the completion of the signal conversion, for instance, after the interlace interpolation in the case of the forward conversion. For economy, a 1F-delay line (1F representing one-field) is used in common both for the field interpolation of the luminance signal and for field interpolation of the chrominance signal. The interlace interpolation is effected to the luminance signal and to the chrominance signal at different frequencies, i.e., the luminance signal is in the form of 30 MHz FM signal, while the chrominance signal is in the form of 4 MHz FM signal. In FIG. 17, a 30 MHz band quartz delay line is used for interlace interpolation of the luminance signals, and the 30 MHz FM luminance signal formed by the interlace interpolation is fed to a ½ counter 91 to generate 15 MHz FM signal. The chrominance signal is frequency-modulated by a frequency-modulator 92 at $f_1$ MHz, and the signal thus modulated is fed to a frequency converter 94 having a local oscillator 93 of ($f_1$+15) MHz or ($f_1$−15) MHz, so as to generate 15 MHz FM-FM signal. Frequency addition is made on the luminance and chrominance signals by a frequency adder 95, which is the same as that used in the line interpolation, so that 30 MHz FM composite signal is formed. The output from the adder 95 is divided into two parts, which are fed to a 1F−H/2-delay line 96 and a delay line 97 for timing, respectively. As shown in FIG. 14, column D, there is a H/2 difference between scanning lines of adjacent fields. In order to ensure the coincidence of color between chrominance signals to be added, provision is made to enable the use of delay time of (1F+H/2) or (1F−H/2) by a switcher 99, which is connected to the one-field-delay line 96 (indicated as 1F−H/2-delay line, in FIG. 17) and a 1H-delay line 98. The 1H-delay line 98 is in turn connected to the 1F−H/2-delay line 96.

The field interpolation of the luminance signal is done by a weighted frequency adder and switcher 100 with an interpolation weight ratio suitable for maintaining the smooth movement in the picture. After the field interpolation, the luminance signal is demodulated by a 30 MHz demodulator 101, and then the high-frequency chrominance signal component thereof is removed by a low-pass filter 102. Thus, the field interpolation of luminance signal is completed.

On the other hand, the chrominance signal is demodulated into 4 MHz FM signal by 30 MHz demodulators 103 and 104, as shown by *1 and *2 marks in FIG. 17. After eliminating unnecessary frequency components by band-pass filters 105 and 106, the field interpolation of the chrominance signal is effected by a weighted frequency adder and a switcher 107.

In the process of the aforesaid field interpolation, the switching of one-field delay to effect the delay of (1F+H/2) or (1F−H/A2) causes vertical movement of the picture by one line, which leads to degradation of the picture quality. Therefore, the one-field-delay line 96 should preferably be either a (1F+H/A2) delay line or a (1F−H/2) delay line, so that the color coincidence of the chrominance signals can be established at the beginning of each field in co-operation with treatment at the chrominance line interpolation preceding the field interpolation.

Now, the controlling system of the converting equipment according to the present invention will be explained in detail.

Figure 18:
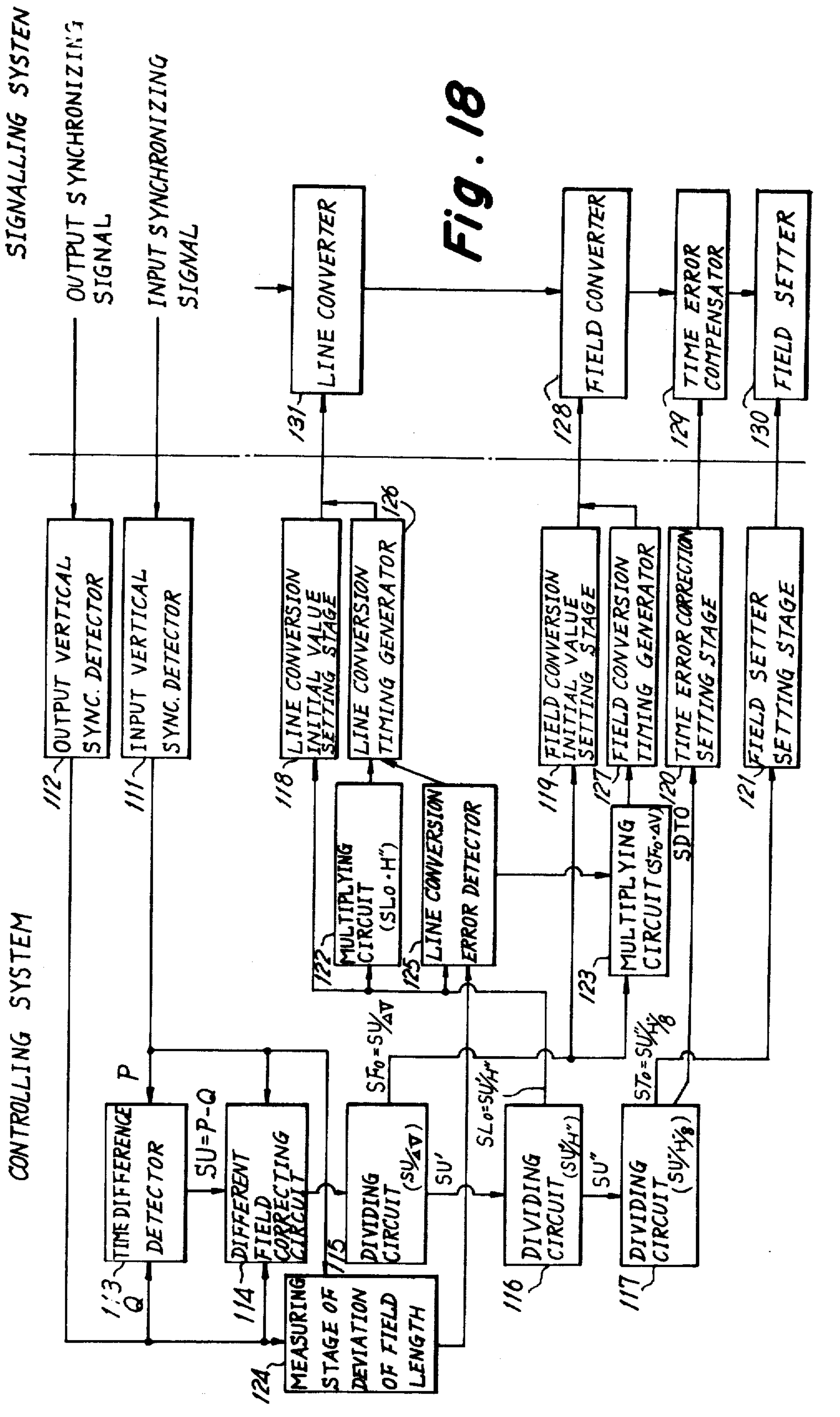
FIG. 18 is a block diagram showing the construction of the controlling system of the converting equipment of the present invention.

In FIG. 18, the signalling system is shown on the right hand side of a chained line and the controlling system is shown on the left hand side of the chained line. The input video signal and the input synchronizing signal are applied to an input vertical synchronizing signal detector 111 and an output vertical synchronizing signal detector 112, respectively. Both outputs of the detectors 111 and 112 are applied to a time difference detector 113 so as to detect the time difference SU between the starting point P of the input field and starting point Q of the output field (SU=P−Q). The time difference signal SU is applied to a different field compensating circuit 114 for compensating a difference of H/2 between even and odd numbered fields. The compensating of the different field may be effected independently from SU. An output from the circuit 114 is applied to a dividing circuit 115. In this circuit 115, the time difference SU is divided in an integer mode by the field conversion unit ΔV. A residue SU′ of said division is applied to a further dividing circuit 116, wherein said residue SU′ is further divided in an integer mode by the line conversion unit H″. A residue SU″ of said division is further applied to a further dividing circuit 117 wherein said residue SU″ is divided in an integer mode by H″/8. It should be noted that the value of H″/8 is only an example and many other values may be employed in relation to other parts of the time error compensator. The integer divisions in the dividing circuits 115 and 116 are essential for the present invention and the integer division in the dividing circuit 117 is carried out in order to control the field setter 130 and the time error compensator 129 as will be explained hereinafter.

A quotient $SF_0$ of SU/ΔV supplied from the dividing circuit 115 and a quotient $SL_0$ of SU′/H″ supplied from the dividing circuit 116 are applied to a stage 118 for setting the initial value of the line conversion and a stage 119 for setting the initial value of the field conversion, respectively, so as to set the initial value $SL_0$ of the line conversion and the initial value $SF_0$ of the field conversion are set. A quotient $SDT_0$ of SU″/H″/8 derived from the dividing circuit 117 is applied to a stage 120 for setting an initial value of the time error correction and to a stage 121 for setting a field setter. The input and output vertical synchronizing signals are further supplied to a stage 124 for measuring a deviation of a field length so as to measure the deviation of the field length from the standard value and its output is applied to a stage 125 for detecting an error in the line conversion so as to detect the line conversion error. A signal thus detected is fed to a stage 126 for producing a timing of the line conversion. The stage 126 further receives an output $SL_0 \times H''$ produced from a multiplying circuit 122 and produces a control signal for setting the timing of the line conversion by means of said multiplied signal and the above mention detected signal. That is the stage 126 produces the timing signal S(LC) for starting the first half period of the line conversion, the timing signal $e(\mathrm{LC})$ for ending the first half period of the line conversion and the timing signal $ss(\mathrm{LC})$ for starting the second half period. These timing signals together with the initial value $SL_o$ of the line conversion are used to control the line converter 131.

Concerning the field conversion, the multiplying circuit 123 receives the above initial value $SF_o$ and the output signal of the line conversion error detector 125 and produces an output signal $SF_o \times \Delta V$. This output is applied to a stage 127 for producing the field conversion timings. The stage 127 produces a timing signal $t(\mathrm{FC})$ [in case of the backward conversion, s(FC) and t(FC) (backward)] for changing state of the field conversion so as to set the initial value $SF_o$ of the field conversion and to control the field converter 128.

The signal $STD_o$ is applied to the stage 120 for setting an initial value of a time error correction and the stage 121 for setting the field setter so as to control a time error compensator 129 and the field setter 130 by setting the initial values. In case of the backward conversion the above apparatus may be used without substantially changing its construction.

Figure 19:
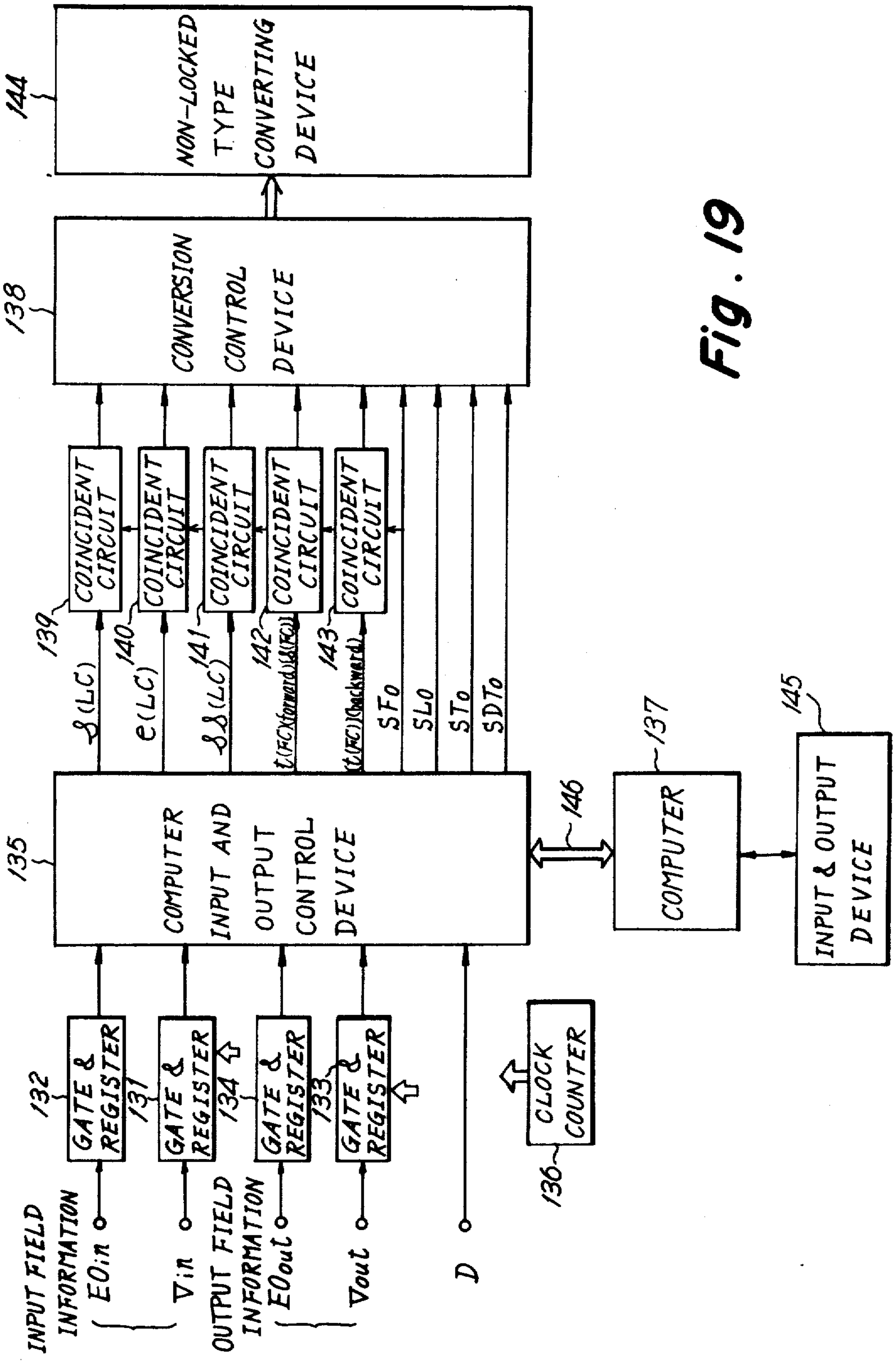
FIG. 19 is a block diagram showing the basic construction of the controlling system using a compact type electronic computer.

FIG. 19 is a block diagram showing a basic construction of the controlling system of the converting equipment according to the invention with a use of a miniature computer of small size. The present controlling system comprises a portion for determining and storing the initial values $SF_o$, $SL_o$ for a moment, the conversion timings $s(\mathrm{LC})$, $e(\mathrm{LC})$, $ss(\mathrm{LC})$, $t(\mathrm{FC})$ and $s(\mathrm{FC})$ in case of the backward conversion and for transmitting them at given instants and a portion for setting the initial values of the conversion with use of the above initial values $SF_o$, $SL_o$ and for determining the start and end points of the conversion by means of the conversion timings such as $s(\mathrm{LC})$, $e(\mathrm{LC})$, $ss(\mathrm{LC})$ AND $T(\mathrm{FC})$ SO AS TO PERFORM THE LINE AND FIELD CONVERSIONS.

In FIG. 19, a vertical synchronizing signal $V_{in}$ and a field parity information $EO_{in}$ of the input field and a vertical synchronizing signal $V_{out}$ and a field parity information $EO_{out}$ of the output field are applied to a computer input and output control device 135 through gate and registers 131, 132, 133 and 134. An information D for indicating the direction of the conversion to be effected is directly applied to the control device 135. To the gates 131 and 133 passing the vertical synchronizing informations of input and output fields are applied pulses from a clock counter 136, which can be commonly used to coincident circuits 139, 140, 141, 142 and 143. By means of the vertical synchronizing pulses, clock pulses are gated out. These informations are fed to a computer 137 wherein the phase difference SU between the starting points P and Q of the input and output fields is divided in the integer mode by the field conversion unit period $\Delta V$ to produce the initial value $SF_o$ of the field conversion and the residue SU' of said division is further divided by the line conversion unit period H'' to derive the initial value $SL_o$ of the line conversion and the residue SU'' is further divided by H''/8 to produce $SDT_o$ for setting the initial value of the coarse adjustment of the time error compensation consisting of the fine and coarse adjustments. The quotients $SF_o$, $SL_o$ and $SDT_o$ are stored in the computer for a moment. The initial value $ST_o$ of the field setter is $H_o/2$ when paired input and output fields to be converted are odd and even fields of different kind and zero when odd and even field of same kind. Further, in the computer 137, the conversion timings $s(\mathrm{LC})$, $e(\mathrm{LC})$, $ss(\mathrm{LC})$, $t(\mathrm{FC})$, $s(\mathrm{FC})$ are calculated from the starting points P and Q and the initial values $SF_o$ and $SL_o$. These timings are temporally stored. The conversion timings for the forward conversion may be calculated by the following equations and stored in transmitting registers in the computer input and output control device 135.

$$s(\mathrm{LC}) = P + SL_o \cdot H'' - (SCD')(H'/2)$$

$$e(\mathrm{LC}) = s(\mathrm{LC}) + (12 + 5SL_o)H_o + 6(2 + SL_o)\delta - (SDC')(H_o/2)$$

$$ss(\mathrm{LC}) = {}^{(LC)} + \Delta V$$

$$t(\mathrm{FC}) = {}^{(LC)} + SF_o \cdot V$$

wherein, H' is a horizontal scanning period of input 625/50 system, H is a horizontal scanning period of output 525/60 system, $H'_o$ is the standard horizontal scanning period of input 625/50 system, $H_o$ is the standard horizontal scanning period of output 525/60 system, $\delta$ is given by $\delta = H' - H'_o = H - H_o$ and [SCD] is 1 for even input fields and 0 for odd input fields and [SCD'] is 1 for even output fields and 0 for odd output fields.

The calculation must be started at an instant one field before than a field to be converted and should be completed by the field to be treated.

In case of the backward conversion, the conversion timings may be calculated in accordance with the following equations, $$s(\mathrm{FC}) = P + SF_o \cdot \Delta V - [SCD](H/2)$$

$$s(\mathrm{LC}) = s(\mathrm{FC}) + SL_o \cdot H'' + ST_o(H''/2)$$

$$e(\mathrm{LC}) = s(\mathrm{FC}) + (262 - 5 \cdot SL_o)H + \Delta V$$

$$ss(\mathrm{LC}) = {}^{(LC)} + 12.5\Delta$$

$$t(FC)\ \text{(backward)} \begin{cases} < e(LC) \\ > s(FC) \end{cases} + (262 - 5SL_0)H$$

These results are stored in registers of the computer input and output control device 135. Also these calculations should be started at an instant one field before than a field to be converted ad should be compoleted before the field to be treated is appeared.

The initial values $SF_o$, $SL_o$, $ST_o$, $SDT_o$ stored in the registers in the control device 135 are directly applied to a conversion control device 138 so as to set the initial values of the field and line conversions and the initial values of the field setter and time error correction. In case of the forward conversion, the timings $s(\mathrm{LC})$, $e(\mathrm{LC})$, $ss(\mathrm{LC})$ and $t(\mathrm{FC})$, while in case of the backward conversion, $s(\mathrm{LC})$, $e(\mathrm{LC})$, $ss(\mathrm{LC})$, $s(\mathrm{FC})$ and $t(\mathrm{FC})$ (backward) are applied to the coincident circuits, 139–143. These concident circuits 139–143 supply pulses to the conversion control device 138 at instants coinciding with outputs of the clock counter 136 so as to determine the start and end points of the line and field conversions. By means of the conversion control device 138, the initial values and the timings of the conversions are controlled so as to control the non-locked type converting device 144 to perform the non-locked type conversion.

To the computer 137 there is connected an input and output device 145 such as a typewriter, a tape reader, puncher, etc. By means of this device 145, a program may be introduced in the computer 137. Moreover when results of the calculations are printed, checking and maintenance of the converting equipment may be carried out.

Figure 20:
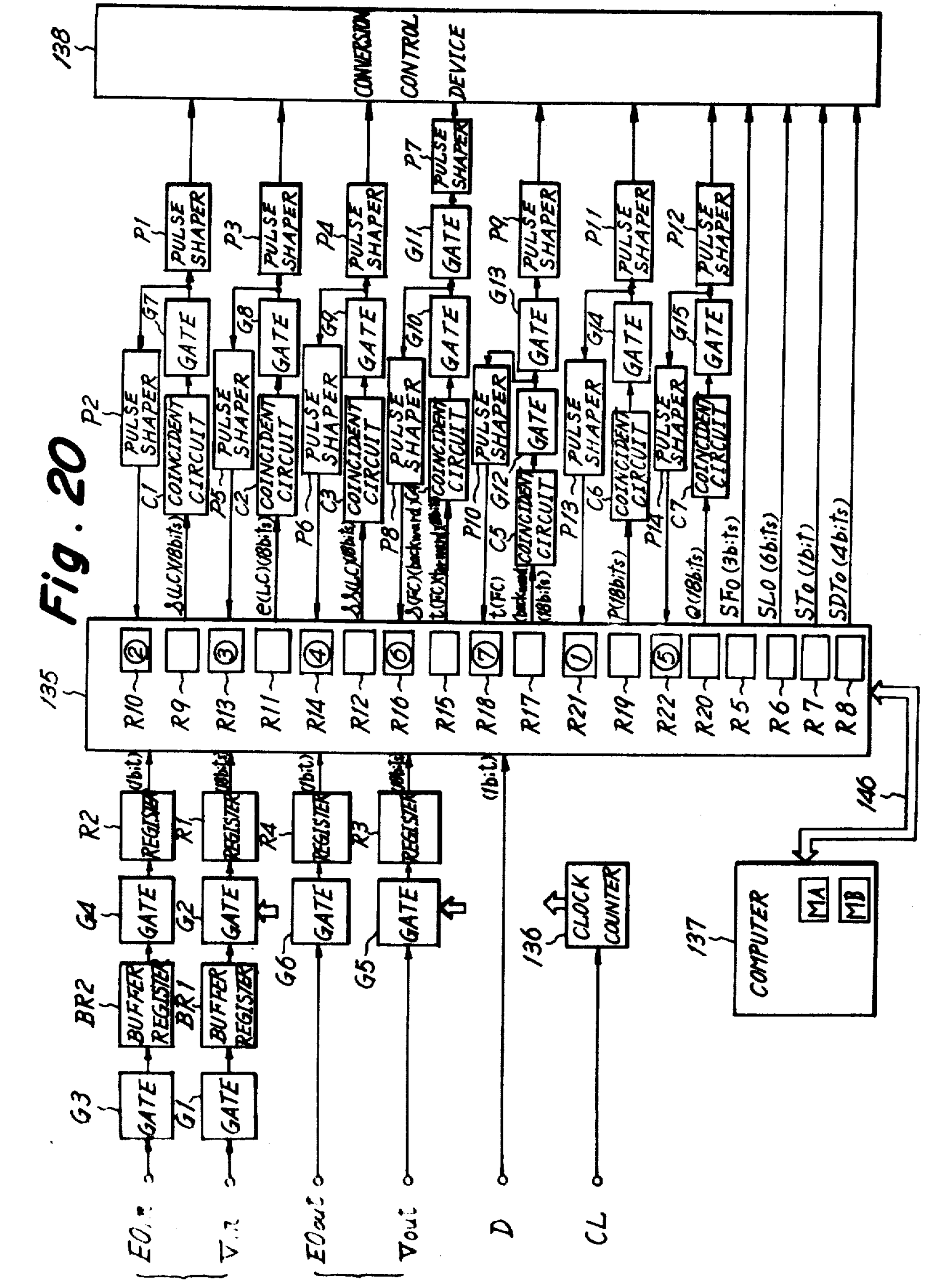
FIG. 20 is a block diagram showing detailed construction of the controlling system using a compact type electronic computer.

Now operations of the control device using a mini-computer will be explained in detail with reference to FIG. 20.

In a gate $G_1$, output pulses from the clock counter 136 are count-gated by the vertical synchronizing pulses $V_{in}$ of the input signal and the pulses thus gated are stored in a register $R_1$. The content of the clock counter 136 is composed of 18 bits in order to start the calculation two fields before than the field to be treated. Therefore, the output of the gate $G_1$ is also composed of 18 bits. If a length of a word of the computer is composed of 12–16 bits, use is made of two words. The pulse $EO_{in}$ indicating the parity of the input field composed of one bit is stored in a register $R_2$ through a gate $G_3$, a buffer register $BR_2$ and a gate $G_4$. The vertical synchronizing pulses $V_{out}$ (18 bits) of the output field and the parity pulse $EO_{out}$ (1 bit) are also stored in registers $R_3$ and $R_4$ through gates $G_5$ and $G_6$, respectively.

A pulse D (1 bit) for indicating the direction of the conversion to be effected is directly applied to the computer input and output control device 135 and stored therein. These informations are coupled to the computer 137 through an information line 146.

Then, in the computer 137, the necessary initial values and timings are calculated with using the input and output informations for the non-locked type conversion. That is, the time difference SU between the starting points of the input and output fields is divided in an integer mode by $\Delta V$, H'', H''/8 successively to derive $SF_0$ (3 bits), $SL_0$ (6 bits), $SDT_0$ (4 bits). These results are stored in registers $R_5$, $R_6$, and $R_8$ of the computer input and output control device 135. $ST_0$ (1 bit) is derived by the calculation and is stored in a register $R_7$. At the same time, these values are directly transferred to the conversion control device 138. In the control device 138, each initial value is set with using these informations.

Concerning the setting of the line conversion timing, the timing $s(LC)$ for starting the first half period of the line conversion of 18 bits will be explained by way of an example. This timing is derived from the input field information P and the initial value $SL_0$ which has been calculated in the following manner;

$$s(LC) = P + SL_0 \times H''$$

This result is stored in a register $R_9$ of the control device. In this manner $s(LC)$ of the field to be converted is calculated from the field starting point P, Q of the input and output signals, at the time of the completion of this calculation, it sometimes appears that data of the previous field stored in the register $R_9$ should not be erased. In such a case the results of the calculation may be stored in a memory MA in the computer 137. However, in this memory MA, there is also data which should not be erased. Thus, according to the invention, there are two memories MA and MB and as soon as $s(LC)$ of the field to be converted is calculated, the result is stored in the memory MA. In this case, if the memory MB is not occupied by an information, the information stored in the memory MA is immediately transferred to the memory MB. Furthermore, if an external register is empty, the information stored in the memory is further transferred to said external register. When the calculated results are transferred, a memory to be directed is checked in order to confirm a fact that whether said memory is occupied or not by the corresponding address "1", "0". If the memory to be directed is not empty, the information is retained.

$s(LC)$ of the field to be converted is finally stored in the register $R_9$ of the computer input and output control device 135. The register $R_9$ is connected to a concident circuit $C_1$. The coincident circuit $C_1$ supplies the timing pulse for determining the start of the first half period of the line conversion when the input signal is coincides with the clock signal of 18 bits supplied from the clock counter 136. The timing pulse is applied to a pulse shaper $P_1$ through a gate $G_7$. In the shaper $P_1$, the shape of the timing pulse is corrected. The resultant signal is supplied to the conversion control device 138. The function of the gate $G_7$ is as follows:

After $s(LC)$ of the field to be converted is applied to the control device 138 and when $s(LC)$ of the next field is supplied to the register $R_{14}$ if the latter $s(LC)$ accidentally coincides with the clock signal from the clock counter 136 to produce a pulse from the coincident circuit $C_1$, it introduces erroneous operation. By providing the gate $G_7$, such erroneous operation can be avoided. Thus the gate $G_7$ acts as an inhibiting circuit. An output of the gate $G_7$ is fed back to the computer control device 135 through a pulse shaper $P_2$ and is stored in a register $R_{10}$.

With respect to the other conversion timings $e(LC)$, $ss(LC)$, the same treatment is carried out and $e(LC)$ and $ss(LC)$ of the field to be converted are stored in registers $R_{11}$ and $R_{12}$ of the computer input and output control device 135. $e(LC)$ and $ss(LC)$ stored in the registers $R_{11}$ and $R_{12}$ are passed through coincident circuits $C_2$ and $C_3$, gates $G_8$ and $G_9$ and pulse shapers $P_3$ and $P_4$, respectively and applied to the conversion control device 138. Also in this case, outputs from the gates $G_8$ and $G_9$ are fed back to the computer input and output control device 135 through pulse shapers $P_5$ and $P_6$ and stored in registers $R_{13}$ and $R_{14}$, respectively.

Next the field conversion timing will be explained. For the field conversion timing in the forward conversion, $t(FC)$ is necessary and in the backward conversion $t(FC)$ and $s(FC)$ are required. First $t(FC)$ is calculated in the same manner as in case of the line conversion timing and stored in a register $R_{15}$ of the computer input and output control device 135. A timing pulse signal is applied to the conversion control device 138 through a coincident circuit $C_4$, gates $G_{10}$, $G_{11}$ and a pulse shaper $P_7$. An output of the gate $G_{10}$ is fed back to the computer input and output control device 135 through a pulse shaper $P_8$ and stored in a register $R_{16}$. Concerning $t(FC)$, there is provided with a further gate $G_{11}$ in addition to the gate $G_{10}$. By this gate $G_{11}$, an error pulse of $t(FC)$ which might be produced immediately after $s(FC)$ when $SL_0$ equals to 50, can be inhibited. An output of this gate $G_{11}$ is supplied to the conversion control device 138 through the pulse shaper $P_7$.

In case of the backward conversion, $s(FC)$ is produced by the network which is used to produce $t(FC)$ in the forward conversion. Concerning $t(FC)$ (reverse), $t(FC)$ stored in a register $R_{17}$ is applied to the conversion control device 138 through a coincident circuit $C_5$, gates $G_{12}$, $G_{13}$ and a pulse shaper $P_9$. Also in this case, $t(FC)$ is fed back to the computer input and output control device 135 through a pulse shaper $P_{10}$ and stored in a register $R_{18}$.

The starting points P, Q of the input and output fields are stored in registers $R_{19}$, $R_{20}$ of the computer input and output control device 135, P and Q are applied to the conversion control device 138 through coincident circuits $C_6$ and $C_7$, gates $G_{14}$ and $G_{15}$ and pulse shapers $P_{11}$ and $P_{12}$, respectively, and further fed back to the computer input and output control device 138 and stored in registers $R_{21}$ and $R_{22}$.

As explained above, the conversion timing signals and the starting points P and Q of the input and output fields are supplied to the conversion control device 138 and at the same time are fed back to the computer input and output control device 135 and stored in the registers $R_{10}$, $R_{13}$, $R_{14}$, $R_{16}$, $R_{18}$, $R_{21}$ and $R_{22}$. When these conversion timing signals $s(LC)$, $e(LC)$, $ss(LC)$, $t(FC)$, $s(FC)$, $t(FC)$ (backward), P and Q are supplied to the conversion control device 138, corresponding data of the next following field must be stored in the registers $R_9$, $R_{11}$, $R_{12}$, $R_{15}$, $R_{17}$, $R_{19}$, and $R_{20}$. To this end, according to the invention, the registers $R_{10}$, $R_{13}$, $R_{14}$, $R_{15}$, $R_{16}$, $R_{18}$, $R_{21}$, and $R_{22}$ have priorities ① – ⑦ as shown in the drawing. These priorities are self-evident and after a calculation under effected is completed, a next calculation will be carried out in accordance with a given priority.

As explained in detail hereinbefore, according to the invention, the converting equipment is consisted of the signalling system comprising the line interpolation, the line conversion, the field conversion and the field interpolation as the basic construction units and the controlling system for controlling the non-locked type conversion and combining the specific functions of the line conversion and the field conversion and the function of performing the non-locked type conversion by exchanging states of the line conversion and the field conversion. Thus the conversion of the television standards can be carried out with being coupled to the output synchronizing signal under a given ratio of the input and output fields.

According to the converting equipment of the present invention, the following advantageous effects can be obtained;

1. Between the color television standard system (625/50) in Europe and NTSC color television system (525/60), the real time conversions of both directions can be performed with excel-lent quality of the picture. It should be noted that between monochrome television standards of 625/50 and monochrome television standards of 525/60, the similar conversion can be effected according to the invention.

2. The converting equipment according to the invention can be constructed by adding the controlling stages for the non-locked type conversion to the locked type converting equipment for effecting the conversion under a ratio of the input and output fields being integer.
3. In the converting equipment of the invention, almost all components of the signalling system and the controlling system can be used commonly for both of the forward and backward conversions so that the converting equipment is utilized economically.
4. The converting equipment according to the invention can be also utilized to form a multi-synchronizing system wherein a signal which need not be converted, for example a monochrome or color television signal passed through a long distance cable must be coupled to a synchronizing signal of the receiving station.

What is claimed is:

1. Equipment for converting a first standard television broadcasting signal to a second standard television broadcasting signal comprising a signalling system, a controlling system and input means (5) for applying said first standard television broadcasting signal to both of said systems;

said signalling systems comprising line interpolator means having an input coupled to an output of said input means, said line interpolator means effecting line interpolation by making a weighted sum of the output signal from said input means and a signal which is obtained by delaying the output signal from said input means by an integer multiple of at least one horizontal scanning period;

line converter means having a first input coupled to an output of said line interpolator means and a second input coupled to a first output of said controlling system, said line converter means converting the number of horizontal scanning lines from those in said first standard television broadcasting signal to a number of horizontal scanning lines corresponding to those in said second standard television broadcasting signal by adjusting delay amount by switching delay lines;

field setter means having an input coupled to an output of said line converter means, said field setter means correcting the interlaced scanning by compensating a time deviation of a half of the horizontal scanning period introduced by said field conversion; and field converter means having a first input coupled to an output of said field setter means and a second input coupled to a second output of said controlling system, said field converter means converting the number of fields in said first standard television broadcasting signal to the number of fields in said second standard television broadcasting signal by adjusting delay amount by switching delay lines; and said controlling system comprising detector means having a first input for receiving said first standard television broadcasting signal and a second input coupled to said signalling system for receiving the synchronizing component of said second standard television broadcasting signal, said detector means detecting the time difference between the starting points of the first and second standard television broadcasting fields;

first means for dividing in an integer mode the time difference (SU) between said fields of the two standards by a field conversion unit ($\Delta V$) to set an initial delay value of the delay lines of the field converter means;

second means dividing in an integer mode a residue of the integer division performed by said first means by a line conversion unit ($H''$) to set an initial delay value of the delay line of the line convertor means; and third means coupling said first and second means to said field and line converter means respectively; said equipment converting said first standard television broadcasting signal to said second standard television broadcasting signal including when the relationship between the number of input and/or output fields per second is not an integer.

2. A converting equipment of standard television broadcasting signals as claimed in claim 1, wherein for the line conversion, a starting point of the line conversion is set in relation to the initial value of the line conversion and for the field conversion, at least one starting point of the field conversion is set in relation to the initial value of the field conversion, said equipment further comprising means for advancing in a stepwise manner the initial value of the field conversion before a second half period of the field conversion is started, so as to control instants of said switchings of the line and field conversions, whereby the television standard system conversion is performed even when the number of input and/or output fields per second is not integer.

3. A converting equipment of standard television broadcasting signals as claimed in claim 2 further comprising a control device consisting of means for calculating delay times for setting timings relating to the line and field conversions;

means having at least two memory addresses for each of said timing data and for successively transferring and storing said timing data after being read out by registers arranged at an input and output control device;

means for adding signals read out of the registers in the input and output control device and clock pulses from a clock counter to derive pulses when these signals coincide with each other so as to derive timing pulses relating to the line conversion, field conversion and input and output synchronizing informations;

means for inhibiting an erroneous operation of the control by means of circuits for inhibiting a passage of said timing pulses during a time period except for a time period during which said timing pulses are passing; and means for providing a priority for the conversion timings, whereby the line and field conversions are so controlled to perform the television standard system conversion even when the number of input and/or output fields per second is not integer.

4. A converting equipment of standard television broadcasting signals as claimed in claim 3, wherein said equipment is to convert a television standard system having 625 scanning lines and 50 fields into a television standard system having 525 scanning lines and 59.94 fields, said equipment further comprising means for setting a starting point of the first half period of the line conversion in relation to an amount of the line conversion and setting a starting point for advancing in a stepwise manner state of the second half period of the field conversion in relation to amounts of the line and field conversions, whereby the line and field conversions are so controlled to perform the television standard system conversion even when the number of input and/or output fields per second is not integer.

5. A converting equipment of standard television broadcasting signals as claimed in claim 3, wherein said equipment is to convert a television standard system of 525 scanning lines and 59.94 fields into a television standard system of 625 scanning lines and 50 fields, said equipment further comprising means for setting a starting point of the first half period of the field conversion in relation to an amount of the field conversion and setting a starting point of the first half period of the line conversion in relation to amounts of the line and field conversions, whereby the line and field conversions are so controlled to perform the television standard system conversion even when the number of input and/or output fields is not integer.

* * * * *